US012491833B2

United States Patent
Carlos et al.

(10) Patent No.: US 12,491,833 B2
(45) Date of Patent: Dec. 9, 2025

(54) COMPUTING SYSTEMS AND METHODS FOR GENERATING USER-SPECIFIC AUTOMATED VEHICLE ACTIONS

(71) Applicant: Mercedes-Benz Group AG, Stuttgart (DE)

(72) Inventors: Katarina Carlos, San Jose, CA (US); David DeHaven, Morgan Hill, CA (US); Niraj Desai, Milpitas, CA (US); Sangho Kim, Santa Clara, CA (US); Christopher Liu, San Mateo, CA (US); Jagjit Pal, Tracy, CA (US); Stephen Piazza, San Jose, CA (US); Adrian Ternes, Staten Island, NY (US); Thomas Victor, Hillsboro, OR (US)

(73) Assignee: Mercedes-Benz Group AG, Stuttgart (DE)

( * ) Notice: Subject to any disclaimer, the term of this patent is extended or adjusted under 35 U.S.C. 154(b) by 107 days.

(21) Appl. No.: 18/081,457

(22) Filed: Dec. 14, 2022

(65) Prior Publication Data
US 2024/0198938 A1    Jun. 20, 2024

(51) Int. Cl.
*B60R 16/037*    (2006.01)
*B60W 10/00*    (2006.01)
*B60W 50/14*    (2020.01)

(52) U.S. Cl.
CPC .......... *B60R 16/037* (2013.01); *B60W 10/00* (2013.01); *B60W 50/14* (2013.01); *B60W 2050/146* (2013.01)

(58) Field of Classification Search
CPC .. B60R 16/037; G05D 1/0061; G05D 1/0088; G05D 1/021; G05D 1/0214;
(Continued)

(56) References Cited

U.S. PATENT DOCUMENTS 9,159,232 B2  10/2015 Ricci
9,754,501 B2   9/2017 Stenneth
(Continued)

FOREIGN PATENT DOCUMENTS

CN    106828370     7/2019
CN    110606033    12/2019
(Continued)

OTHER PUBLICATIONS

International Search Report and Written Opinion for PCT Application PCT/EP2023/083246, mailed Mar. 27, 2024, 14 pages.
(Continued)

*Primary Examiner* — Anne Marie Antonucci
*Assistant Examiner* — Patrick M Brady
(74) *Attorney, Agent, or Firm* — Dority & Manning, P.A.

(57) ABSTRACT

Methods, computing systems, and technology for automated vehicle action generation are presented. For example, a computing system may generate content for presentation to a user via a user interface of a display device. The content may include user interface elements for inputting one or more triggering conditions associated with a vehicle function of a vehicle and one or more settings of the vehicle function. The computing system may receive, via the user interface, data indicative of user input specifying the triggering conditions and data indicative of user input specifying the settings of the vehicle function. The computing system may determine an automated vehicle action that defines a relationship between the triggering conditions and the settings of the vehicle function. The computing system may output command instructions for the vehicle to implement the automated vehicle action for automatically controlling the vehicle function based on whether the vehicle detects the triggering conditions.

18 Claims, 13 Drawing Sheets

(58) Field of Classification Search
CPC ... G05D 1/0221; G05D 1/0223; B60W 50/14; B60W 2050/146
See application file for complete search history.

(56) References Cited

U.S. PATENT DOCUMENTS

| | | |
|---|---|---|
| 10,850,693 B1 | 12/2020 | Pertsel et al. |
| 11,351,941 B1 | 6/2022 | Maney, Jr. et al. |
| 11,498,500 B1 | 11/2022 | Pertsel et al. |
| 11,794,676 B1 | 10/2023 | Benqassmi et al. |
| 2003/0125845 A1 | 7/2003 | Carlstedt et al. |
| 2008/0306656 A1 | 12/2008 | Baumann et al. |
| 2012/0296567 A1 | 11/2012 | Breed |
| 2014/0165159 A1 | 6/2014 | Baade et al. |
| 2016/0047662 A1 | 2/2016 | Ricci |
| 2016/0149547 A1 | 5/2016 | Rider et al. |
| 2017/0305437 A1 | 10/2017 | Onorato et al. |
| 2018/0141562 A1 | 5/2018 | Singbal |
| 2018/0265095 A1 | 9/2018 | Joe et al. |
| 2019/0084372 A1 | 3/2019 | Gallagher |
| 2019/0101985 A1 | 4/2019 | Sajda et al. |
| 2019/0176837 A1 | 6/2019 | Williams et al. |
| 2019/0266418 A1 | 8/2019 | Xu et al. |
| 2020/0101976 A1 | 4/2020 | Cella |
| 2020/0242421 A1 | 7/2020 | Sobhany |
| 2020/0386562 A1 | 12/2020 | Cella |
| 2021/0053418 A1 | 2/2021 | Kale et al. |
| 2021/0061201 A1 | 3/2021 | Goluguri et al. |
| 2021/0078382 A1 | 3/2021 | Maeng et al. |
| 2021/0323444 A1 | 10/2021 | Fields et al. |
| 2021/0402942 A1 | 12/2021 | Torabi et al. |
| 2022/0089063 A1 | 3/2022 | Fields et al. |
| 2022/0194228 A1* | 6/2022 | Salter ............... B60K 35/28 |
| 2023/0062004 A1* | 3/2023 | Okamoto ............ B60K 35/10 |
| 2023/0077434 A1 | 3/2023 | Penilla et al. |
| 2024/0326743 A1* | 10/2024 | Fang ................ B60R 25/24 |

FOREIGN PATENT DOCUMENTS

| | | |
|---|---|---|
| CN | 110607970 | 12/2019 |
| CN | 111216605 | 6/2020 |
| DE | 102018206557 A1 | 10/2019 |
| DE | 102019119460 | 1/2021 |
| EP | 2369299 | 8/2013 |
| EP | 3240714 B1 | 8/2023 |
| IN | 201921009938 | 3/2019 |
| JP | 2008-195102 A | 8/2008 |
| JP | 2010-070171 A | 4/2010 |
| WO | 2009/088835 A2 | 7/2009 |

OTHER PUBLICATIONS

U.S. Appl. No. 18/081,318, filed Dec. 14, 2022, 75 pages.
Final Office Action for the U.S. Appl. No. 18/081,318 from the United States Patent and Trademark Office dated Apr. 10, 2025.
Non-Final Office Action for the U.S. Appl. No. 18/081,318 from the United States Patent and Trademark Office dated Sep. 29, 2024.
International Report and Written Opinion for Application PCT/EP2023/082527, mailed Mar. 1, 2024, 12 pages.

* cited by examiner

900A ⭢

| ACTION ID | NAME | VEHICLE FUNCTION | TRIGGERING CONDITIONS | AUTOMATED SETTING |
|---|---|---|---|---|
| 905A → ID12345 | MorningCommuteAction | SEAT TEMP. FUNCTION SEAT MASSAGE FUNCTION MUSIC FUNCTION | WITHIN X m OF LAT/LONG OR ROUTE BETWEEN 7:50-8:25 AM EXTERIOR TEMP < 70°F | HIGH CLASSIC MASSAGE SMOOTH JAZZ |
| 905B → ID67890 | EveningCommuteAction | SEAT MASSAGE | @ WORK 17:06-17:20 PM | FIRM |
| 905C → ID09876 | PMWindowOpenAction | DRIVER WINDOW | WITHIN X m OF LAT/LONG 17:05-17:20 PM EXTERIOR TEMP > 70°F | OPEN |
| ... | ... | ... | ... | ... |

USER PROFILE 1

| ACTION ID | NAME | VEHICLE FUNCTION | TRIGGERING CONDITIONS | AUTOMATED SETTING |
|---|---|---|---|---|
| 950A → ID54321 | AMSeatMassageAction | SEAT MASSAGE | WITHIN X m OF LAT/LONG BETWEEN 9:56-10:43 PM EXTERIOR TEMP > 55°C | GENTLE |
| 950B → ID90911 | PMSeatVentAction | SEAT VENTILATION | @ WORK 12:56-13:21 PM EXTERIOR TEMP > 48°C | LEVEL 1 |
| 950C → ID91277 | PMWindowAction | SUNROOF | WITHIN X m OF LAT/LONG 13:15-13:45 PM EXTERIOR TEMP > 60°C | OPEN |
| ... | ... | ... | ... | ... |

USER PROFILE 2

FIG. 9B

COMPUTING SYSTEMS AND METHODS FOR GENERATING USER-SPECIFIC AUTOMATED VEHICLE ACTIONS

FIELD

The present disclosure relates generally to generating vehicle actions that are to be automatically executed by a vehicle and are specifically tailored to a user of the vehicle.

BACKGROUND

Vehicles, such as automobiles, have onboard control systems that operate certain features of a vehicle in response to input from an operator of the vehicle. This includes control features such as braking, acceleration, and steering, as well as comfort-related features such as air conditioning and seating position. The operator may physically manipulate a device or touchscreen element to control these features as the operator sees fit.

SUMMARY

Aspects and advantages of implementations of the present disclosure will be set forth in part in the following description, or may be learned from the description, or may be learned through practice of the implementations.

Example aspects of the present disclosure are directed to a computing system that may perform a computer-implemented method, such as when a control circuit of the computing system executes instructions on one or more computer-readable media. The method may include generating content for presentation to a user via a user interface of a display device. The content may include one or more user interface elements for inputting one or more triggering conditions associated with a vehicle function of a vehicle and one or more settings of the vehicle function. The method may include receiving, via the user interface, data indicative of user input specifying the one or more triggering conditions. The method may include receiving, via the user interface, data indicative of user input specifying the one or more settings of the vehicle function. The method may include determining an automated vehicle action that defines a relationship between the one or more triggering conditions and the one or more settings of the vehicle function. The method may include outputting command instructions for the vehicle to implement the automated vehicle action for automatically controlling the vehicle function based on whether the vehicle detects the one or more triggering conditions.

In an embodiment, the automated vehicle action may indicate at least one of: (i) when, (ii) where, or (iii) under what temperature conditions, the vehicle is to automatically control the vehicle function in accordance with the one or more settings.

In an embodiment, the method may further include determining whether a conflict between the automated vehicle action and a pre-existing automated vehicle action exists or does not exist.

In an embodiment, the method may include, in response to determining the conflict does exist, generating a prompt for presentation to the user via the user interface of the display device, wherein the prompt requests the user to indicate whether to replace the pre-existing automated vehicle action with the automated vehicle action or to discard the automated vehicle action.

In an embodiment, the method may include providing the command instructions for storage in an accessible memory on the vehicle for execution at a subsequent time.

In an embodiment, the command instructions may be stored in the accessible memory with a plurality of other command instructions for a plurality of other automated vehicle actions associated with the user.

In an embodiment, the method may include detecting an occurrence of the one or more triggering conditions; and based on the one or more triggering conditions, transmitting a signal to implement the one or more settings of the vehicle function.

In an embodiment, the method may include transmitting, over a network to a server system, a communication indicative of the command instructions for storage in association with a user profile of the user.

In an embodiment, the display device may be a display screen of a mobile user device.

In an embodiment, the display device may be a display screen of the vehicle.

In an embodiment, the vehicle function may include: (i) a window function, (ii) a seat function, (iii) a temperature function, or (iv) a music function.

In an embodiment, the seat function may include: a seat temperature function, a seat ventilation function, or a seat massage function.

In an embodiment, the one or more settings of the vehicle function may be indicative of at least one of: (i) an on/off state, (ii) an open/close state, (iii) a temperature level, (iv) a massage level, or (v) a music selection.

In an embodiment, the user may be a first user, wherein the command instructions for the automated vehicle action are associated with a first user profile of the first user. The method may include receiving data indicative of a second user profile of a second user of the vehicle; and providing for storage, in an accessible memory of the vehicle, command instructions for a second automated vehicle action associated with the second user profile. The second automated vehicle action may be based on user input provided by the second user to a second user interface on a second display device.

In an embodiment, the second display device may be a display screen of a mobile user device or a display screen of another vehicle.

In an embodiment, the method may include determining whether a conflict between the automated vehicle action and a pre-existing automated vehicle action exists or does not exist; and in response to determining the conflict does exist, generating a prompt for presentation to the user via the user interface of the display device. The prompt may indicate the conflict between the automated vehicle action and the pre-existing automated vehicle action.

Other example aspects of the present disclosure are directed to other systems, methods, vehicles, apparatuses, tangible non-transitory computer-readable media, and devices for improving the operation of, and computational efficiency associated with, a vehicle.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIGS. 9A-B illustrate example data structures including data associated with automated vehicle actions according to an embodiment hereof.

DETAILED DESCRIPTION

Figure 1:
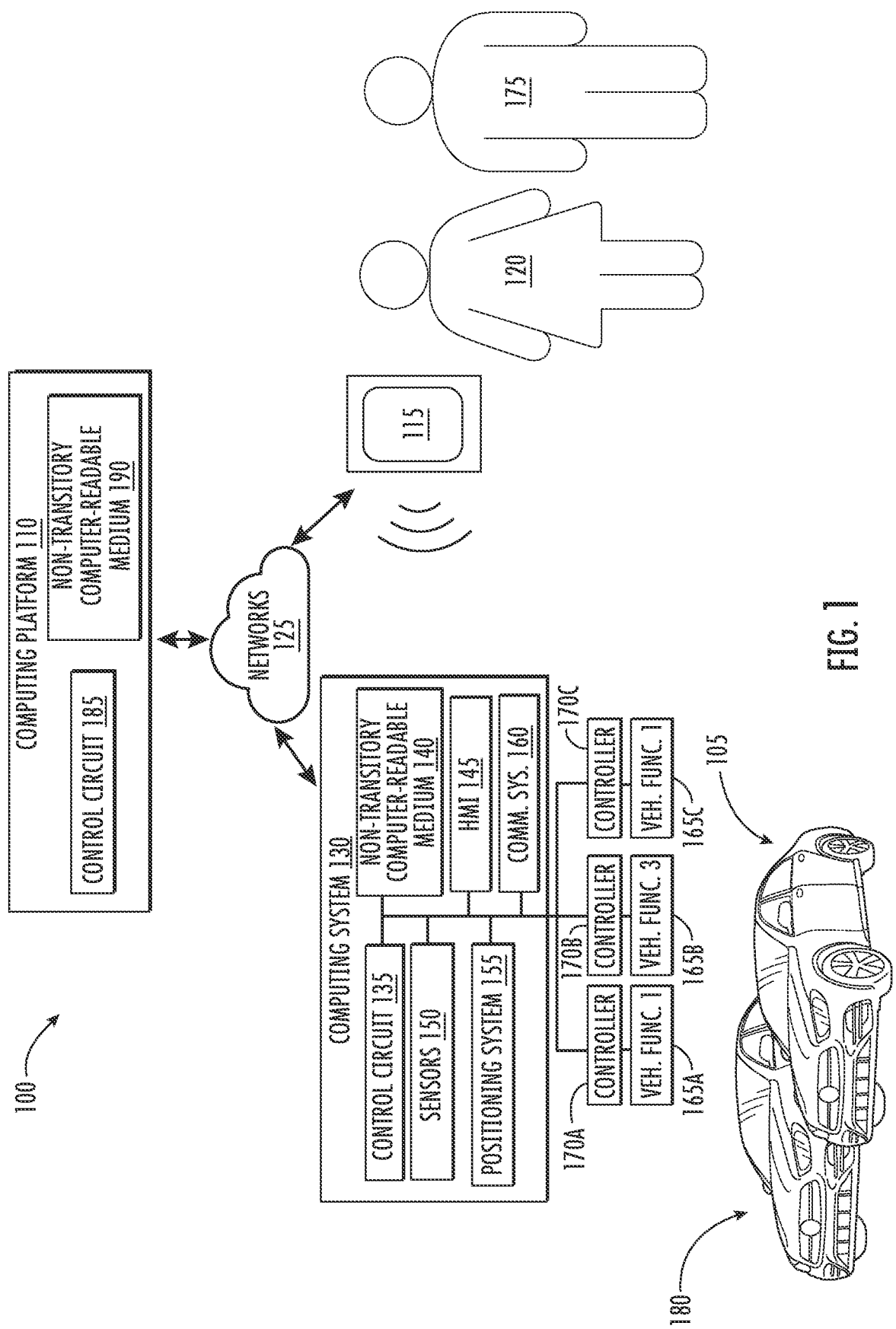
FIG. 1 illustrates an example computing ecosystem according to an embodiment hereof.

An aspect of the present disclosure relates to collecting user input from a user of a vehicle and, based on the user input, generating actions that are to be automatically performed by the vehicle for the specific user. The actions may be intelligently aggregated from a variety of sources and wirelessly distributed to multiple vehicles for the user. For instance, a vehicle (e.g., an automobile) may include a plurality of vehicle functions. A vehicle function may refer to a functionality or operation that the vehicle is configured to perform based on input. For example, a user (e.g., a driver of the vehicle) may interact with a vehicle function to activate or adjust the temperature level of the user's seat. To automate the vehicle function according to the user's preferences, the user may provide user input (e.g., to an onboard display device) indicating the user's preferred setting of the vehicle function and the conditions under which the vehicle should automatically trigger the vehicle function. Based on this data, the vehicle may create a skill (also referred to as a routine) for the vehicle. The skill/routine may be associated with one or more vehicle specific functions or non-vehicle specific functions. For example, in an embodiment, the skill/routine may include an "automated vehicle action" that automatically implements the vehicle functionality as the user prefers. The vehicle may also transmit data indicative of the automated vehicle action to a remote computing system (e.g., a cloud-based server system) that is configured to aggregate the automated vehicle actions for the user.

By way of example, the user may desire to have the vehicle automatically activate certain vehicle functions during the user's morning commute. In an example, the vehicle functions may include a seat heating function and a seat massage function. Using the technology of the present disclosure, the user may define the conditions ("triggering conditions") for when the vehicle is to activate the user's preferred settings for the seat heating and massage functions.

To help facilitate the collection of such user input, the user may be presented with one or more user interfaces. For instance, a computing system may generate content for presentation to the user via a user interface of a display device. In an embodiment, the computing system may include the vehicle's onboard computing system and the display device may include a display screen (e.g., touchscreen) of infotainment system display in the vehicle. Additionally, or alternatively, the computing system may include a mobile user device of the user and the display device may include a display screen of the mobile user device. The content may include one or more user interface elements (e.g., soft buttons, drop-down menus) for inputting triggering conditions and settings for the vehicle functions.

The computing system may receive, via a user interface, data indicative of user input specifying the triggering conditions and the settings of the vehicle functions. For instance, the computing system may receive data indicating a time condition and a temperature condition. The user input may specify the time condition as between 7:50-8:25 AM on Monday through Friday (e.g., the user's morning commute) and the temperature condition as below 70 degrees Fahrenheit. The user input may specify a "high" setting for the seat heating function and a "classic massage" setting for the seat massage function.

Based on the user input, the computing system may determine an automated vehicle action that defines a relationship between the triggering conditions and the settings. The automated vehicle action may indicate when, where, or under what triggering conditions the vehicle is to automatically control the vehicle functions in accordance with the user's preferred settings. For instance, based on the above user input, the computing system may generate, for the user's morning commute, an automated vehicle action that indicates: when the user starts driving the vehicle between 7:50-8:25 AM on Monday through Friday and the temperature is below 70 degrees Fahrenheit, the vehicle is to activate the "high" setting of the seat heating function and the "classic massage" setting of the seat massage function.

To confirm that the automated vehicle action is appropriate, the computing system may determine whether the new automated vehicle action conflicts with another automated vehicle action. For instance, the computing system may compare the automated setting and the triggering conditions of the new automated vehicle action with those of a pre-existing automated vehicle action. Based on the comparison, the computing system may confirm that the vehicle is capable of performing both automated vehicle actions, without modifying either of them.

In an embodiment, the computing system may request that a user approve the automated vehicle action before storing it in the vehicle's memory for execution. To do so, the computing system may generate content for presentation to a user via the vehicle's onboard display device. The content may be a prompt that requests the user's approval by selecting an element on a touch screen, providing a verbal confirmation, etc. Upon approval, the computing system may output command instructions for the vehicle to implement the automated vehicle action for automatically controlling the vehicle functions (e.g., the seat heating, massage functions) in accordance with the user-selected settings (e.g., high heat, classic massage) based on whether the vehicle detects the triggering conditions. The command instructions may indicate that the vehicle is to monitor for the triggering conditions and activate the "high" heat setting for the seat and the "classic massage" setting for the seat massage function, when the triggering conditions occur. A library may store the command instructions to maintain the automated vehicle actions in association with the specific user or the user's profile.

In an embodiment, the computing system may transmit data indicative of the automated vehicle action to another computing system that is remote from the vehicle. The remote computing system (e.g., a cloud platform) may be configured to aggregate the automated vehicle actions for the user. Aggregation of the automated vehicle actions may include storing the actions in a remote library in association with a user profile of the user. In an embodiment, the remote computing system may aggregate automated vehicle actions that were generated by the user through a plurality of different computing sources. For example, the remote computing system may aggregate automated vehicle actions that were generated onboard a first vehicle, with those generated onboard a second vehicle, as well as those generated via the user's mobile phone. As will be further described herein, in an embodiment, the remote computing system may aggregate automated vehicle actions that were generated based on user input with those generated via artificial intelligence running onboard the vehicle.

The remote computing system may aggregate and store the automated vehicle actions in a remote library so that the user's automated vehicle actions may be automatically downloaded to another vehicle that may be operated by the user. In this way, the systems and methods of the present disclosure may automate actions for a user in a manner that is personalized to the user and transferrable across multiple vehicles.

The technology of the present disclosure provides a number of technical effects and improvements to vehicle and computing technology. For example, in a single instance, a computing system may obtain user input to create an automated vehicle action for repeated, automatic implementation by the vehicle across multiple future instances. As such, the technology of the present disclosure may reduce or replace frequent manual instruction or configuration inputs from the user, which may otherwise cause delays in implementing user preferences. In this manner, the technology of the present disclosure may also increase responsiveness of the vehicle in implementing vehicle functions (e.g., reduced latency).

The automated vehicle actions generated by the systems and methods of the present disclosure may also improve the efficiency of the vehicle's onboard computing resources. For instance, automating a vehicle action based on a user's preferred routine may reduce the number of user interactions that a user would otherwise have with a particular vehicle function. By reducing the frequency of user interaction, the vehicle may reduce the amount of processing and memory resources that are spent each time a user manually adjusts a vehicle function. Additionally, this may lead to less wear on the physical interfaces associated with the vehicle functions.

The technology of the present disclosure may also help reduce unnecessary usage of computational resources across multiple vehicles. For example, as further described herein, automated vehicle actions created by a first vehicle may be transferred to a second vehicle (e.g., by a cloud platform that maintains the user's profile). In this way, the second vehicle may avoid using its computational resources to recreate the automated vehicle actions that were already determined by the first vehicle.

Ultimately, the systems and methods of the present disclosure improve the computational efficiency and configurability of a vehicle while also providing a personalized user experience that may be wirelessly transferred to another vehicle.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. The vehicle 105, the computing platform 110, and the user device 115 may be configured to communicate with one another via one or more networks 125.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 125 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115.

The computing platform 110 may include one or more computing devices. For instance, the computing platform 110 may include a control circuit 185 and a non-transitory computer-readable medium 190 (e.g., memory). The control circuit 185 of the computing platform 110 may be configured to perform the various operations and functions described herein.

In an embodiment, the control circuit 185 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit.

In an embodiment, the control circuit 185 may be programmed by one or more computer-readable or computer-executable instructions stored on the non-transitory computer-readable medium 190.

In an embodiment, the non-transitory computer-readable medium 190 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 190 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 190 may store computer-executable instructions or computer-readable instructions, such as instructions to perform the operations and methods described herein.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 185 to perform one or more functional tasks. The modules and computer-readable/executable instructions may be described as performing various operations or tasks when a control circuit or other hardware component is executing the modules or computer-readable instructions.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith. The launch of a software application for a respective transportation platform may initiate a user-network session with the computing platform 110.

The networks 125 may be any type of network or combination of networks that allows for communication between devices. In some implementations, the networks 125 may include one or more of a local area network, wide area network, the Internet, secure network, cellular network, mesh network, peer-to-peer communication link or some combination thereof and may include any number of wired or wireless links. Communication over the networks 125 may be accomplished, for instance, via a network interface using any type of protocol, protection scheme, encoding, format, packaging, etc. Communication between the computing system 130 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a power train and one or more power sources. The power train may include a motor, e-motor, transmission, driveshaft, axles, differential, e-components, gear, etc. The power sources may include one or more types of power sources. For example, the vehicle 105 may be a fully electric vehicle (EV) that is capable of operating a power train of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like.

The display device may display a variety of content to the user 120 including information about the vehicle 105, prompts for user input, etc. The display device may include a touchscreen through which the user 120 may provide user input to a user interface. The display device may be associated with an audio input device (e.g., microphone) for receiving audio input from the user 120. In some implementations, the display device may function as a dashboard of the vehicle 105.

The interior of the vehicle 105 may include one or more lighting elements. The lighting elements may be configured to emit light at various colors, brightness levels, etc.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a computing system 130 that is onboard the vehicle 105. The computing system 130 may be located onboard the vehicle 105 in that it is included on or within the vehicle 105. The computing system 130 may include one or more computing devices, which may include various computing hardware components. For instance, the computing system 130 may include a control circuit 135 and a non-transitory computer-readable medium 140 (e.g., memory). The control circuit 135 may be configured to perform the various operations and functions for implementing the technology described herein.

In an embodiment, the control circuit 135 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 135 and/or computing system 130 may be part of, or may form, a vehicle control unit (also referred to as a vehicle controller) that is embedded or otherwise disposed in the vehicle 105 (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior and interior controller (CEIC), a zone controller, or any other controller (the term "or" and "and/or" may be used interchangeably herein).

In an embodiment, the control circuit 135 may be programmed by one or more computer-readable or computer-executable instructions stored on the non-transitory computer-readable medium 140.

In an embodiment, the non-transitory computer-readable medium 140 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 140 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 140 may store computer-executable instructions or computer-readable instructions, such as instructions to perform the methods of FIGS. 10A-B and 11. Additionally, or alternatively, similar such instructions may be stored in the computing platform 110 (e.g., the non-transitory computer-readable medium 190) and provided over the networks 125.

The computing system 130 (e.g., the control circuit 135) may be configured to communicate with the other components of the vehicle 105 via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

The vehicle 105 may include one or more human-machine interfaces (HMIs) 145. The human-machine interfaces 145 may include a display device, as described herein. The display device (e.g., touchscreen) may be viewable by a user of the vehicle 105 (e.g., user 120, second user 175) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats).

The vehicle 105 may include one or more sensors 150. The sensors 150 may be configured to acquire sensor data. This may include sensor data associated with the surrounding environment of the vehicle 105, sensor data associated with the interior of the vehicle 105, or sensor data associated with a particular vehicle function. The sensor data may be indicative of conditions observed in the interior of the vehicle, exterior of the vehicle, or in the surrounding environment. For instance, the sensor data may acquire image data, inside/outside temperature data, weather data, data indicative of a position of a user/object within the vehicle 105, weight data, motion/gesture data, audio data, or other types of data. The sensors 150 may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may also include other sensors configured to acquire data associated with the vehicle 105. For example, the vehicle 105 may include inertial measurement units, wheel odometry devices, or other sensors.

The vehicle 105 may include a positioning system 155. The positioning system 155 may be configured to generate position data (also referred to as location data) indicative of a position (also referred to as a location) of the vehicle 105. For example, the positioning system 155 may determine position by using one or more of inertial sensors (e.g., inertial measurement units, etc.), a satellite positioning system, based on IP address, by using triangulation and/or proximity to network access points or other network components (e.g., cellular towers, WiFi access points, etc.), or other suitable techniques. The positioning system 155 may determine a current location of the vehicle 105. The location may be expressed as a set of coordinates (e.g., latitude, longitude), an address, a semantic location (e.g., "at work"), etc.

In an embodiment, the positioning system 155 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 155 may localize the vehicle 105 within the environment (e.g., across multiple axes) based on the map data. For example, the positioning system 155 may process sensor data (e.g., LIDAR data, camera data, etc.) to match it to a map of the surrounding environment to get an understanding of the vehicle's position within that environment. The determined position of the vehicle 105 may be used by various systems of the computing system 130 or provided to the computing platform 110.

The vehicle 105 may include a communications system 160 configured to allow the vehicle 105 (and its computing system 130) to communicate with other computing devices. The computing system 130 may use the communications system 160 to communicate with the computing platform 110 or one or more other remote computing devices over a network 125 (e.g., via one or more wireless signal connections). In some implementations, the communications system 160 may allow communication among one or more of the systems on-board the vehicle 105.

In an embodiment, the communications system 160 may be configured to allow the vehicle 105 to communicate with or otherwise receive data from the user device 115. The communications system 160 may utilize various communication technologies such as, for example, Bluetooth low energy protocol, radio frequency signaling, or other short range or near filed communication technologies. The communications system 160 may include any suitable components for interfacing with one or more networks, including, for example, transmitters, receivers, ports, controllers, antennas, or other suitable components that may help facilitate communication.

The vehicle 105 may include a plurality of vehicle functions 165A-C. A vehicle function 165A-C may be a functionality that the vehicle 105 is configured to perform based on a detected input. The vehicle functions 165A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions.

The vehicle comfort functions may include a window function (e.g., for a door window, sunroof), a seat function, a wall function, a steering wheel function, a pedal function or other comfort functions. In an embodiment, the seat function may include, for example, a seat temperature function that controls the temperature of the seat. This may include a specific temperature (e.g., in degrees C./F) or a temperature level (e.g., low, medium, high). In an embodiment, the seat function may include a seat ventilation function for controlling the ventilation system of a seat. In an embodiment, the seat function may include a seat massage function for controlling the massager devices within a seat. The seat massage function may have one or more levels, each reflective of the intensity of the massage. In an embodiment, the seat massage function may have one or more programs/settings, each reflective of a different type or combination of massage. In an embodiment, the seat function may include a seat position function for controlling a position of a seat in one or more directions, for example forward/backward or up/down. A pedal function may control a position of one or more pedal controls (e.g., a brake pedal, an accelerator pedal) relative to a user's feet. A wall function may control the temperature of the vehicle interior wall or door. A steering wheel function may control a temperature, position, or vibration of the steering wheel.

The vehicle staging functions may control the interior lighting of the vehicle 105. In an embodiment, the vehicle staging functions may include an interior lighting function. For example, the interior lighting function may control the color, brightness, intensity, etc. of the interior lights of the vehicle 105 (e.g., the ambient lighting). In an embodiment, the vehicle staging functions may include one or more predefined lighting programs or combinations. The programs may be set by the user or pre-programed into the default settings of the vehicle 105. In some implementations, the vehicle staging functions may include an exterior lighting function. For example, the exterior lighting function may control accent lighting under or otherwise located along the exterior of the vehicle 105.

The vehicle climate functions may control the interior climate of the vehicle 105. In an embodiment, the vehicle climate functions may include an air conditioning/heating function for controlling the air conditioning/heating system or other systems associated with setting the temperature within the cabin of the vehicle 105. In an embodiment, the vehicle climate functions may include a defrost or fan function for controlling a level, type, and/or location of air flow within the cabin of vehicle 105. In an embodiment, the vehicle climate functions may include an air fragrance function for controlling a fragrance within the interior of the vehicle 105.

The vehicle navigation functions may control the vehicle's system for providing a route to a particular destination. For example, the vehicle 105 may include an onboard navigation system that provides a route to the user 120 for travelling to a destination. The navigation system may leverage map data and global positioning system (GPS) based signals to provide guidance to the user 120 via a display device within the interior of the vehicle 105.

The vehicle parking functions may control the vehicle's parking-related features. In an embodiment, the vehicle parking function may include a parking camera function that controls a side, rear, or three-hundred-sixty-degree camera to assist a user 120 when parking the vehicle 105. Additionally, or alternatively, the vehicle parking function may include a parking assistance function that helps to maneuver the vehicle 105 into a parking area.

The vehicle entertainment functions may control one or more entertainment-related features of the vehicle 105. For example, the vehicle entertainment functions may include a music function for controlling a radio or controlling another source of audio or visual media. The vehicle entertainment functions may control sound parameters (e.g., volume, bass, treble, speaker distribution) or select a radio station or media content type/source.

Each vehicle function may include a controller 170A-C associated with that particular vehicle function 165A-C. The controller 170A-C for a particular vehicle function may include control circuitry configured to operate its associated vehicle function 165A-C. For example, a controller may include circuitry configured to turn the seat heating function on, to turn the seat heating function off, set a particular temperature or temperature level, etc.

In an embodiment, a controller 170A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 170A-C may be configured to send signals to the control circuit 135 or another onboard system. The signals may encode data associated with a respective vehicle function. The encoded data may indicate, for example, a function setting, timing, etc.

The user 120 may interact with a vehicle function 165A-C through user input. The user input may specify a setting of the vehicle function 165A-C selected by the user (a "user-selected setting"). In an embodiment, a vehicle function 165A-C may be associated with a physical interface such as, for example, a button, a knob, a switch, a lever, a touch screen interface element, or other physical mechanism. The physical interface may be physically manipulated to control the vehicle function 165A-C in accordance with the user-selected setting. By way of example, a user 120 may physically manipulate a button associated with a seat massage function to set the seat massage function to a level five massage intensity. In an embodiment, the user 120 may interact with a vehicle function 165A-C via a user interface element presented on a user interface of a display device (e.g., of a infotainment system in dashboard of the vehicle).

The technology of the present disclosure may collect data from the user 120 indicating a certain vehicle function that is to be automatically controlled by the vehicle 105 and generate a database of actions/skills/routines that may be automatically executed by the vehicle 105 for the specific user 120. These automatically executable actions/skills/routines may be referred to as "automated vehicle actions." A user 120 may authorize and activate the computing system 130 to capture data and generate these automated vehicle actions. Such authorization/activation may be provided via user input to a user interface of a display device (e.g., of the infotainment system of the vehicle 105). The technology for generating the automated vehicle actions will now be described in greater detail.

Figure 2:
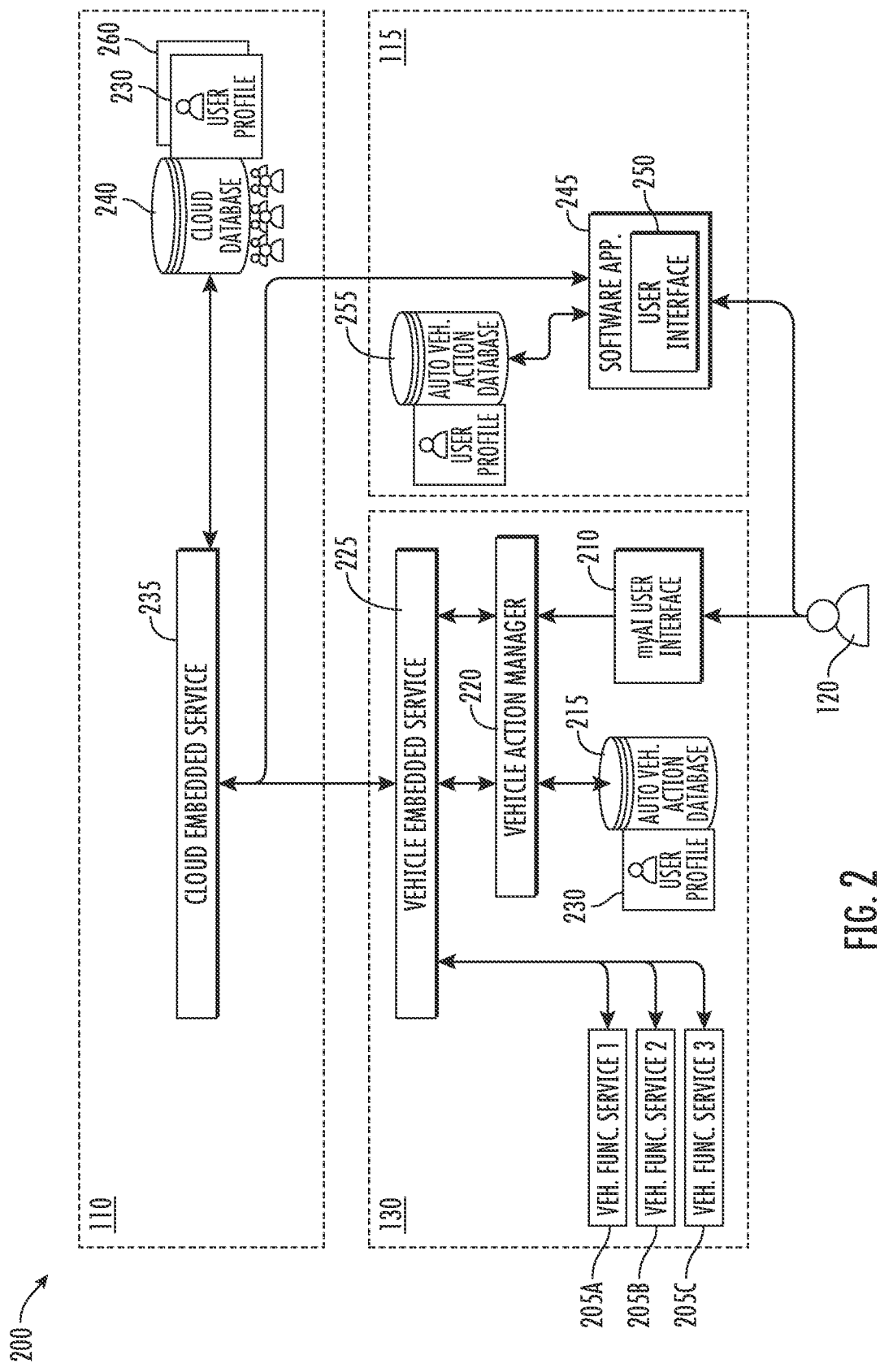
FIG. 2 illustrates a diagram of an example computing architecture according to an embodiment hereof.

FIG. 2 illustrates a diagram of an example computing architecture 200 for generating automated vehicle actions according to an embodiment hereof. The architecture 200 may include: (i) various databases for stored information; (ii) services that perform automated tasks, respond to hardware events, provide data, listen for data requests from other software, etc.; and (iii) software clients. In an embodiment, the services and clients may be implemented as modules within their respective computing systems. For instance, the services and clients may be implemented as modules on the vehicle 105 (e.g., within computing system 130) or remote from the vehicle 105 (e.g., within the computing platform 110). In an embodiment, one or more components of the computing architecture 200 may be implemented on the user device 115.

The computing system 130 may include various services and databases that may be implemented on the vehicle 105 for generating automated vehicle actions based on user input provided by the user 120. In an embodiment, the computing system 130 may include: vehicle function services 205A-C, one or more user interfaces 210, an automated vehicle action database 215, a vehicle action manager 220, and a vehicle embedded service 225.

The vehicle function services 205A-C may be configured to listen for data associated with the vehicle functions 165A-C. In an embodiment, the computing system 130 may include one vehicle function service 205A-C for each vehicle function 165A-C. The vehicle function service 205A-C may listen for context data associated with the respective vehicle function (e.g., via controller 170A-C, associated sensor, etc.). The context data may be indicative of conditions that are observed by the computing system 130. The vehicle function services 205A-C may be configured to communicate the context data to the vehicle embedded service 225.

The one or more user interfaces 210 may be configured to present information to, and allow the computing system 130 to obtain information from, the user 120. For instance, the user interfaces 210 may be presented via a display device associated with the computing system 130. The user interfaces 210 may be presented, for example, by using rendering techniques for processing code to generate interactive content that can be visualized on the display device. The display device may include a display screen (e.g., touch screen) of an infotainment system or other user computing device onboard the vehicle 105. The user interfaces 210 may include text, symbols, graphics, images, etc. to communicate information to the user 120. In an embodiment, such information may be provided via a prompt to the user 120. The user interfaces 210 may include one or more user interface elements that are programmed for the user 120 to interact with to provide user input. The user interface elements may include menus (e.g., drop-down lists), hyperlinks, text fields, toggles, soft buttons, virtual keyboards, selection elements, checkboxes, or other types of user interface elements. The user 120 may interact with the user interface elements via various types of user input including a touch input, cursor input, audio input (e.g., voice command), gesture input, or other types of user input.

The user 120 may interact with the user interface elements of the user interfaces 210 to provide user input associated with a vehicle function 165A-C of the vehicle 105. For example, as will be further described herein with reference to FIGS. 3-7, the user 120 may interact with the user interface elements to indicate a preferred setting for a vehicle function 165A-C (e.g., a seat temperature function, a seat massage function, an entertainment function) and the triggering conditions (e.g., time, temperature, location) that will cause the vehicle 105 to automatically control that vehicle function 165A-C to implement the preferred setting.

With reference still to FIG. 2, the vehicle action manager 220 may be configured to manage automated vehicle actions. In an embodiment, the vehicle action manager 220 may include a service for performing its management responsibilities. The management of automated vehicle actions may include coordinating, for example, the creation and modification of automated vehicle actions, conflict analysis, automated vehicle action persistence, context observation, or automated vehicle action dispatching. The vehicle action manager 220 may be programmed to implement a collection of components and libraries for managing the generation of the automated vehicle actions. In some implementations, the vehicle action manager 220 may include a framework that leverages one or more software factories for returning one or more objects for use by the vehicle action manager 220.

In an embodiment, the vehicle action manager 220 may provide one or more software development kits (SDKs) that help allow a vehicle (e.g., its clients and services) to generate and execute the automated vehicle actions. For instance, the SDKs may include: a standardized object library based on an interface definition, client objects to establish communication to another client or device (e.g., IPC communication to the cloud platform 110), a client authentication mechanism, standardized logging and metrics (analytics) hooks and tooling, and/or other components.

In an embodiment, the vehicle action manager 220 may include a client interface to the service of the vehicle action manager 220. For instance, the vehicle action manager 220 may include a client interface that is configured to establish a client connection to the onboard service of the vehicle action manager 220. This may include, for example, establishing a connection to the service using inter-process communication (IPC) such as unix-domain sockets (UDS) or message queueing (mqueue). In an embodiment, the manager client may not utilize client authentication onboard the vehicle 105. For example, a client-service relationship may be established at software build time so that client processes that link to the SDKs may be provided the ability to interact with the service of the vehicle action manager 220.

In an embodiment, the vehicle action manager 220 (or the vehicle embedded service 225) may maintain an automated vehicle action database 215. As will be further described herein, the automated vehicle action database 215 may store a data structure that includes command instructions for the automated vehicle actions associated with a specific user 120 or a user profile 230. In an embodiment, the automated vehicle action database 215 may concurrently store the automated vehicle actions for more than one user (or user profiles).

The vehicle embedded service 225 may be a service for syncing, maintaining, and managing the execution of automated vehicle actions. The vehicle embedded service 225 may provide an API for various clients and a bridge to the vehicle 105 to extrapolate context data (e.g., as data points) and execute the automated vehicle actions.

The vehicle embedded service 225 may be configured to receive data from the vehicle function services 205A-C and determine if any triggering conditions for the stored automated vehicle actions exist. The vehicle embedded service 225 may be configured to transmit signals to control a vehicle function 165A-C in accordance with an automated vehicle action in the event the triggering conditions exist, as will be further described herein.

The vehicle embedded service 225 may be configured to synchronize automated vehicle actions with a computing system that is remote from the vehicle 105. For instance, the vehicle embedded service 225 may be configured to transmit data indicative of automated vehicle actions that are generated onboard the vehicle 105 to the computing platform 110 (e.g., a cloud-based server system).

The computing platform 110 may include various services and databases that may be implemented on its servers for supporting the management and generation of automated vehicle actions. In an embodiment, the computing platform 110 may include: a cloud embedded service 235 and a cloud database 240.

The cloud embedded service 235 may be a service for syncing, aggregating, maintaining, and managing automated vehicle actions in a system that is remote from the vehicle 105. In an embodiment, the cloud embedded service 235 may provide APIs for various clients to manage automated vehicle actions. The possible clients may include, for example, a service running onboard the vehicle 105, a mobile software application (e.g., IOS, Android), or a web application.

In an embodiment, the cloud embedded service 235 may include or otherwise be associated with a cloud manager (offboard the vehicle) configured to perform operations and functions similar to the vehicle action manager 220. For instance, the cloud manager may include a client configured to establish a client connection to a cloud manager service (e.g., a connection to the service using a TCP-based protocol such as HTTP). In some implementations, client authentication may be required to establish a connection. This may include, for example, using a token-based authentication scheme.

The cloud embedded service 235 may be configured to aggregate automated vehicle actions for the user 120. Aggregation of the automated vehicle actions may include storing the automated vehicle actions for a particular user in a memory in association with the user profile 230 of the user 120. The cloud embedded service 235 may be configured to aggregate automated vehicle actions that are created via a plurality of different sources. This may include, for example, automated vehicle actions created onboard different vehicles or via the user device 115. In some implementations, as will be further described herein, the cloud embedded service 235 may aggregate one or more automated vehicle actions that were created based on user input with one or more automated vehicle actions that were created via machine-learning technology.

The cloud embedded service 235 may be configured to maintain a data structure that identifies the automated vehicle actions for a particular user 120. This may include, for example, receiving data indicative of automated vehicle actions generated onboard a vehicle 105, identifying a particular user profile 230 of the user 120 of the vehicle 105 for which the automated vehicle actions were generated, and providing the data indicative of automated vehicle actions for storage in association with the user profile 230 in the cloud database 240. The cloud embedded service 235 may identify a user profile 230 from among a plurality of user profiles based on data provided from the vehicle 105. This may include encrypted pseudonymized data associated with the user 120 (e.g., encrypted user ID), which may be decrypted and used with a look-up function to access the appropriate user profile 230. The cloud embedded service 235 may be configured to update the cloud database 240 to include new automated vehicle actions or to remove automated vehicle actions (e.g., when an action is disabled or deleted by a user).

The cloud database 240 may store information for a plurality of users. For instance, the cloud database 240 may store a plurality of data structures that include the automated vehicle actions. A respective data structure may include a table or list of the automated vehicle actions associated with a particular user profile. The table/list may index the automated vehicle actions according to vehicle function 165A-C. The respective data structure may be adjusted to reflect an updated representation of the automated vehicle actions associated with a particular user profile (e.g., when new actions are generated, previous actions removed, etc.). The cloud database 240 may store different data structures associated with different users. In an embodiment, the cloud database 240 may store a plurality of user profiles, each respectively associated with a different respective user.

In an embodiment, the cloud embedded service 235 may be configured to provide data indicative of a user profile and its associated vehicle actions to the vehicle 105. For example, a user 120 may be identified by the vehicle embedded service 225 when the user 120 enters the vehicle 105 (e.g., based on a handshake between the user's key or user device with the vehicle 105, a user profile selection on a head unit display). The user 120 may be different than the last user to operate the vehicle 105. The vehicle embedded service 225 may transmit pseudonymized data indicative of the user 120 and request data indicative of the user profile 230 of the user 120 (and the automated vehicle actions associated therewith). The cloud embedded service 235 may receive this request, access the cloud database 240 to retrieve the requested data, and transmit data indicative of the requested user profile 230 (and the automated vehicle actions associated therewith) to the vehicle embedded service 225. The vehicle embedded service 225 may store the data indicative of the automated vehicle actions associated with the user 120 in the automated vehicle action database 215 (e.g., as an active user of the vehicle 105).

In an embodiment, the vehicle embedded service 225 may request more than one user profile from the cloud embedded service 235. For instance, two users may enter the vehicle 105: a first user 120 as a driver and a second user 175 (shown in FIG. 1) as a passenger. The computing system 130 may detect the presence of the first user based on a handshake between the first user's key (or mobile device) with the vehicle 105 or the first user 120 may provide user input to a display device of the vehicle 105 to select a user profile of the first user. The computing system 130 may detect the presence of the second user 175 based on a handshake between the second user's key (or mobile device) with the vehicle 105 or the second user 175 may provide user input to a display device of the vehicle 105 to select a profile of the second user 175. In response, the computing system 130 may transmit a request to the cloud embedded service 235 for a first user profile 230 of the first user 120 and a second user profile 260 of the second user 175. The cloud embedded service 235 may retrieve data indicative of the first and second user profiles 230, 260 from the cloud database 240 and transmit the profile data to the computing system 130.

In an embodiment, the user device 115 may be configured to determine automated vehicle actions associated with the user 120. For instance, the user device 115 may include a software application 245 that is downloadable to the user device 115. The software application 245 may be associated with the vehicle 105, the computing platform 110, a manufacturer of the vehicle 105, a manager of the vehicle 105, a distributor of the vehicle 105, a supplier of the vehicle 105, etc.

The software application 245 may be programmed to present one or more user interfaces 250 via a display device of the user device 115. The user interfaces 250 may be similar or provide similar functionality to the user interfaces 210. For example, the user interfaces 250 may include user interface elements that allow the user 120 to provide user input specifying a preferred setting of a vehicle function 165A-C and one or more triggering conditions for automatically activating the vehicle function 165A-C. The user input may be provided, for example, via a touch input to the user device 115. In an embodiment, the user input may be provided by audio input to an input device (e.g., microphone) of the user device 115.

In an embodiment, the user device 115 may include an automated vehicle database 255. The automated vehicle database 255 may provide a similar functionality as automated vehicle database 215. For instance, the automated vehicle database 255 may store automated vehicle actions generated via the user device 115 in association with the user profile 230 of the user 120.

The user device 115 may be configured to transmit data indicative of an automated vehicle action to the cloud platform 110. For instance, the cloud embedded service 235 may receive data indicative of an automated vehicle action (or the command instructions associated therewith) created by the user 120 via the software application 245 running on the user device 115. The cloud embedded service 235 may store data indicative of the automated vehicle action in the cloud database 240. In an embodiment, the cloud embedded service 235 may aggregate an automated vehicle action generated via the user device 115 with one or more automated vehicle actions generated via another source (e.g., the computing system 130 of the vehicle 105).

Figure 3:
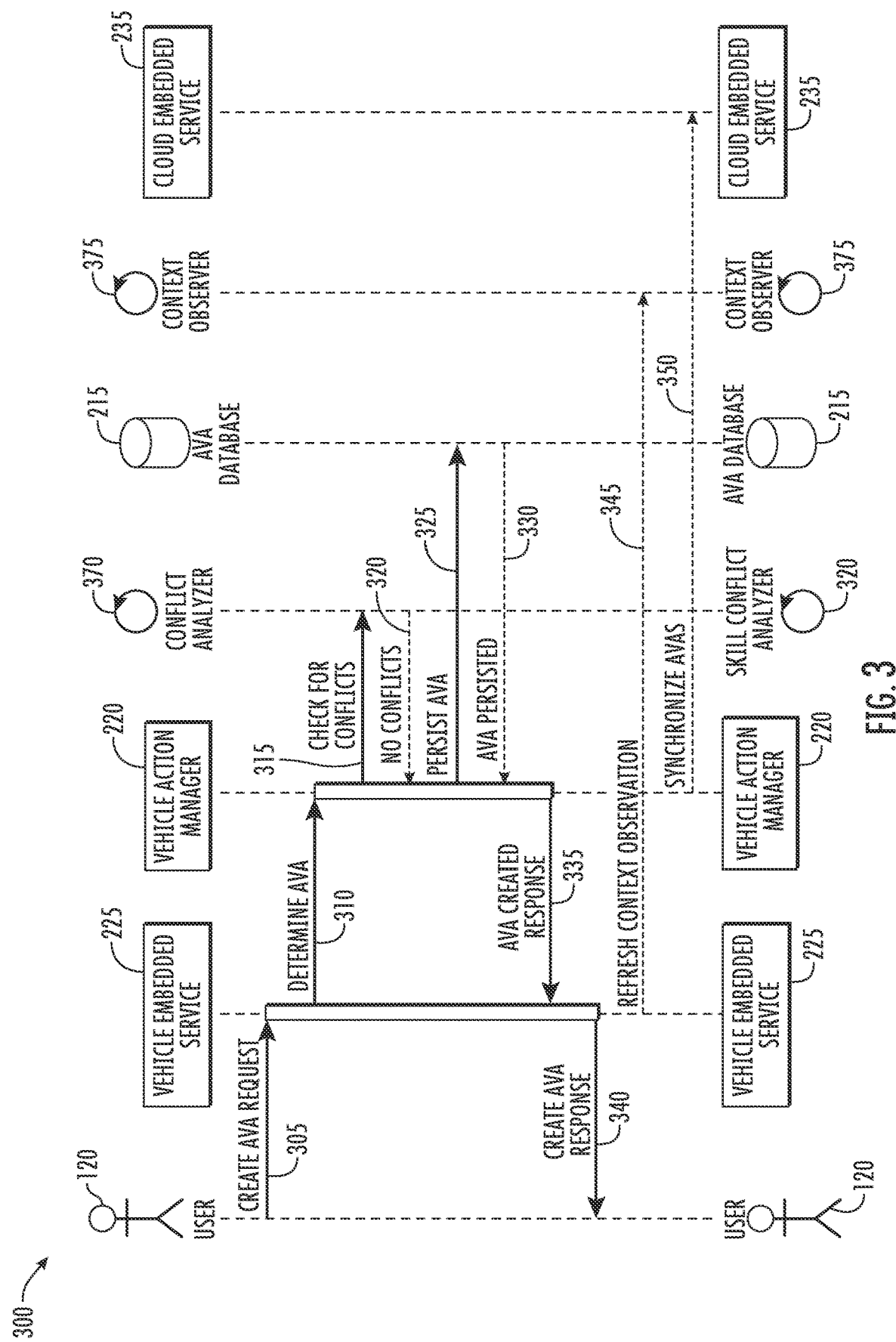
FIG. 3 illustrates a diagram of an example data flow according to an embodiment hereof.

FIG. 3 illustrates a diagram of an example data flow 300 for generating automated vehicle actions based on user input according to an embodiment hereof. The following description of the data flow 300 is described with an example implementation in which the computing system 130 is utilized to generate an automated vehicle action onboard the vehicle 105. Additionally, or alternatively, one or more portions of the pipeline of data represented by the data flow 300 may be implemented via the computing platform 110 or the user device 115.

At (305), the computing system 130 may receive a request to create an automated vehicle action (referred to as "AVA" in FIG. 3). For instance, the user 120 may select a user interface element displayed on a display device of the vehicle 105. The user interface element may include, for example, a "create AVA" soft button that initiates a software application or program for generating an automated vehicle action.

In response to the request, the computing system 130 may generate content for presentation to a user via a user interface of a display device. The content may include one or more user interface elements for inputting one or more triggering conditions associated with a vehicle function of a vehicle and one or more settings of the vehicle function. As described herein, the settings may indicate a user's preferred setting for a vehicle function. The triggering conditions may indicate the circumstances in which the settings are to be activated. In an embodiment, the content may include a user interface that includes the one or more user interface elements. The user interface elements may be presented via the user interface to prompt the user 120 for information.

Figure 4:
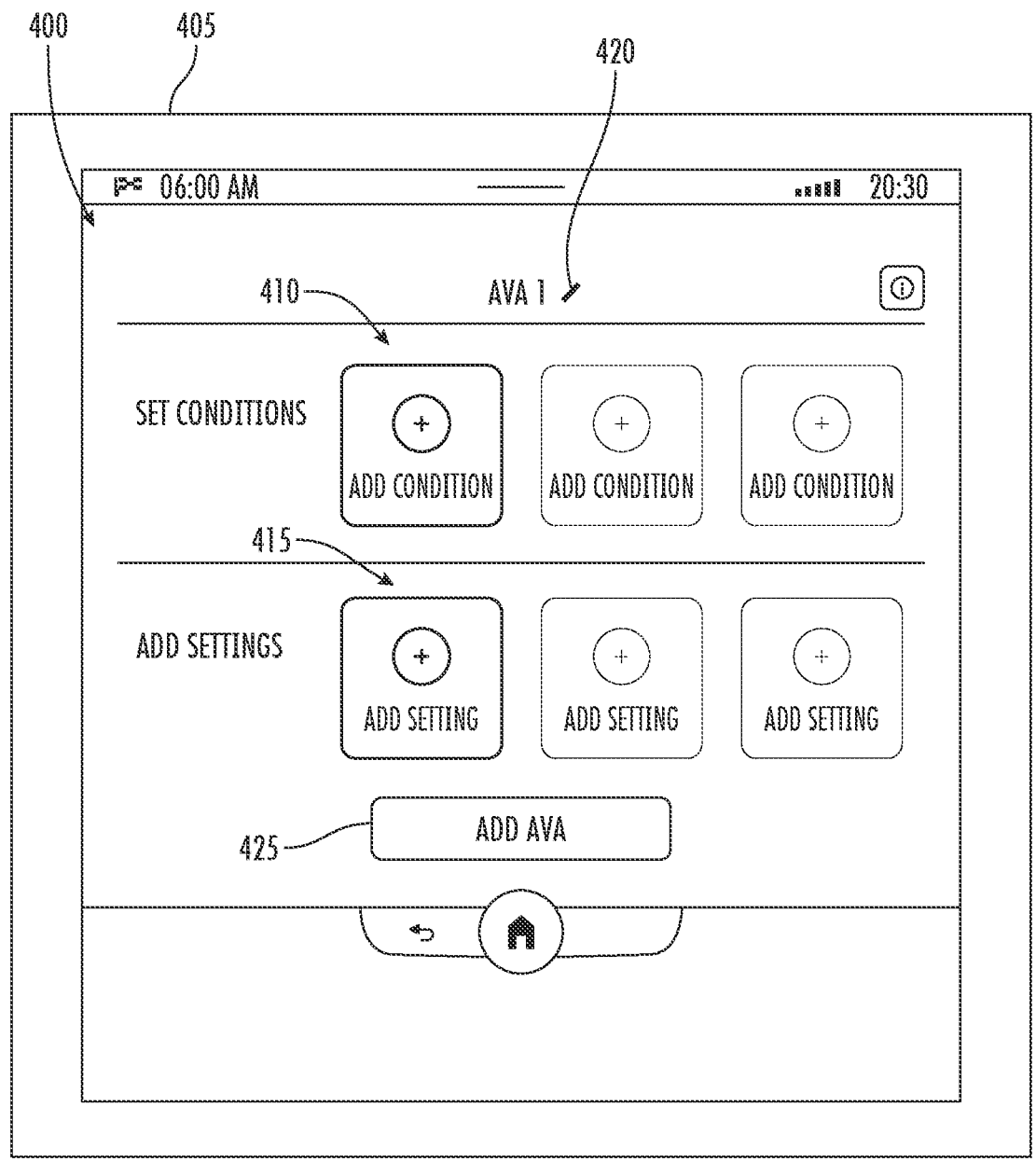
FIGS. 4-8 illustrate diagrams of example user interfaces on an example display device according to an embodiment hereof.
Figure 5:
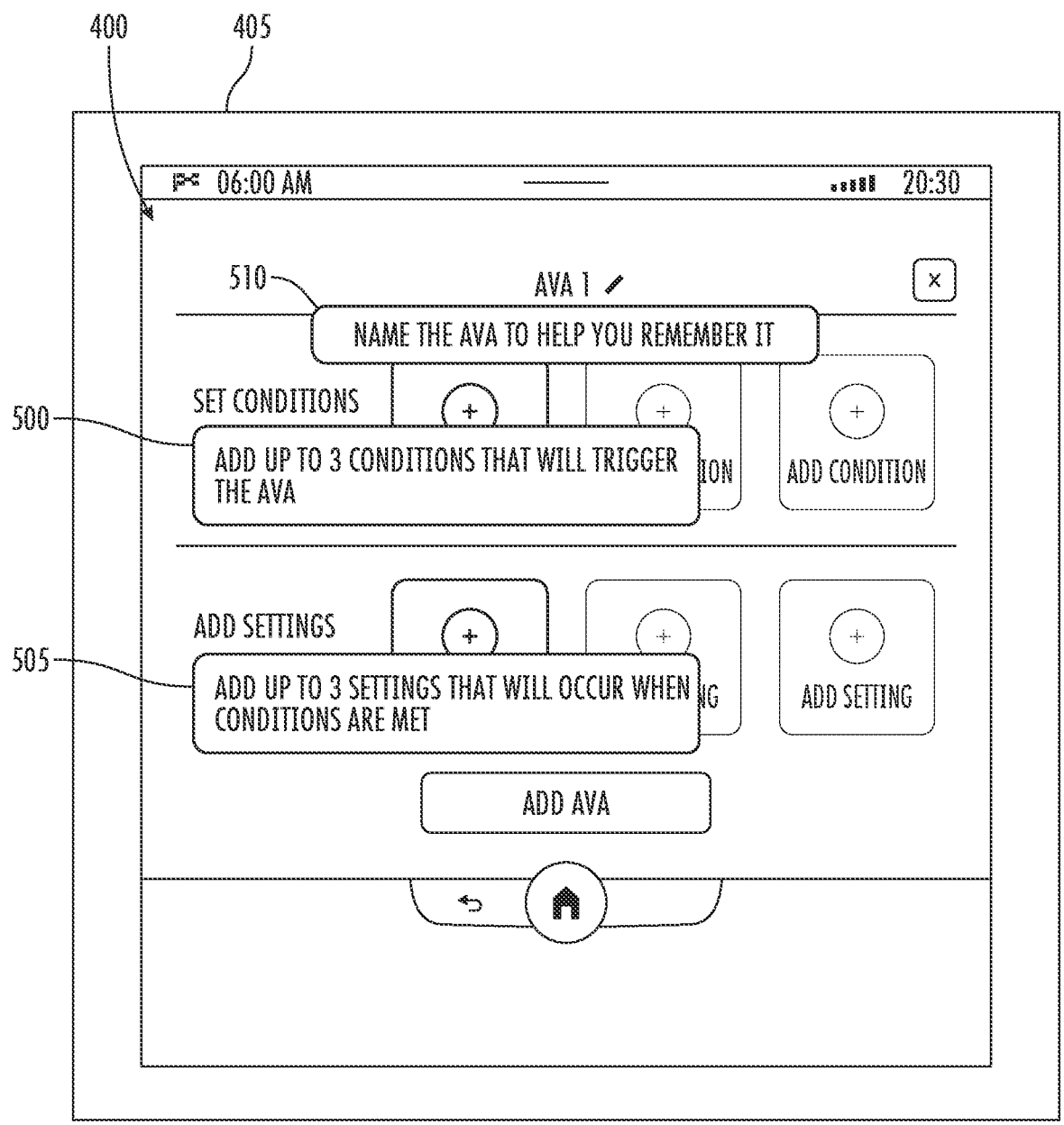

In an example, FIG. 4 illustrates a diagram of an example user interface 400 on an example display device 405 according to an embodiment hereof. The display device 405 may be a display device onboard the vehicle 105 and may be included in (or otherwise in communication with) the computing system 130 of the vehicle 105.

The computing system 130 may receive, via the user interface 400, data indicative of user input specifying the one or more triggering conditions. For instance, the user interface 400 may include one or more user interface elements 410 that allow the user 120 to provide user input to select the one or more triggering conditions. The user interface elements 410 may include a soft button, or other interactive user interface element, that allows the user 120 to provide user input associated with the triggering conditions. The triggering conditions may be the one or more conditions that are to be detected by the computing system 130 in order to trigger the activation or adjustment of a user-selected setting for a particular vehicle function. This may include day, time, location, temperature, weather, traffic, noise, or other types of triggering conditions.

In an embodiment, the user 120 may interact with a user interface element 410 by touching the display device, scrolling over the element, etc. to cause the display of instructions or guidance associated with the user interface elements 410. By way of example, the user 120 may provide a touch input to at least one of the user interface elements 410 to cause the display of the informational element 500 (e.g., text box) shown in FIG. 5. The informational element 500 may include text that provides the user 120 with guidance on the types of input that may be provided via the user interface elements 410. This may include, for example, an explanation as to the type, number, etc. of triggering conditions that may be provided by the user 120 for a particular automated vehicle action.

Figure 6:
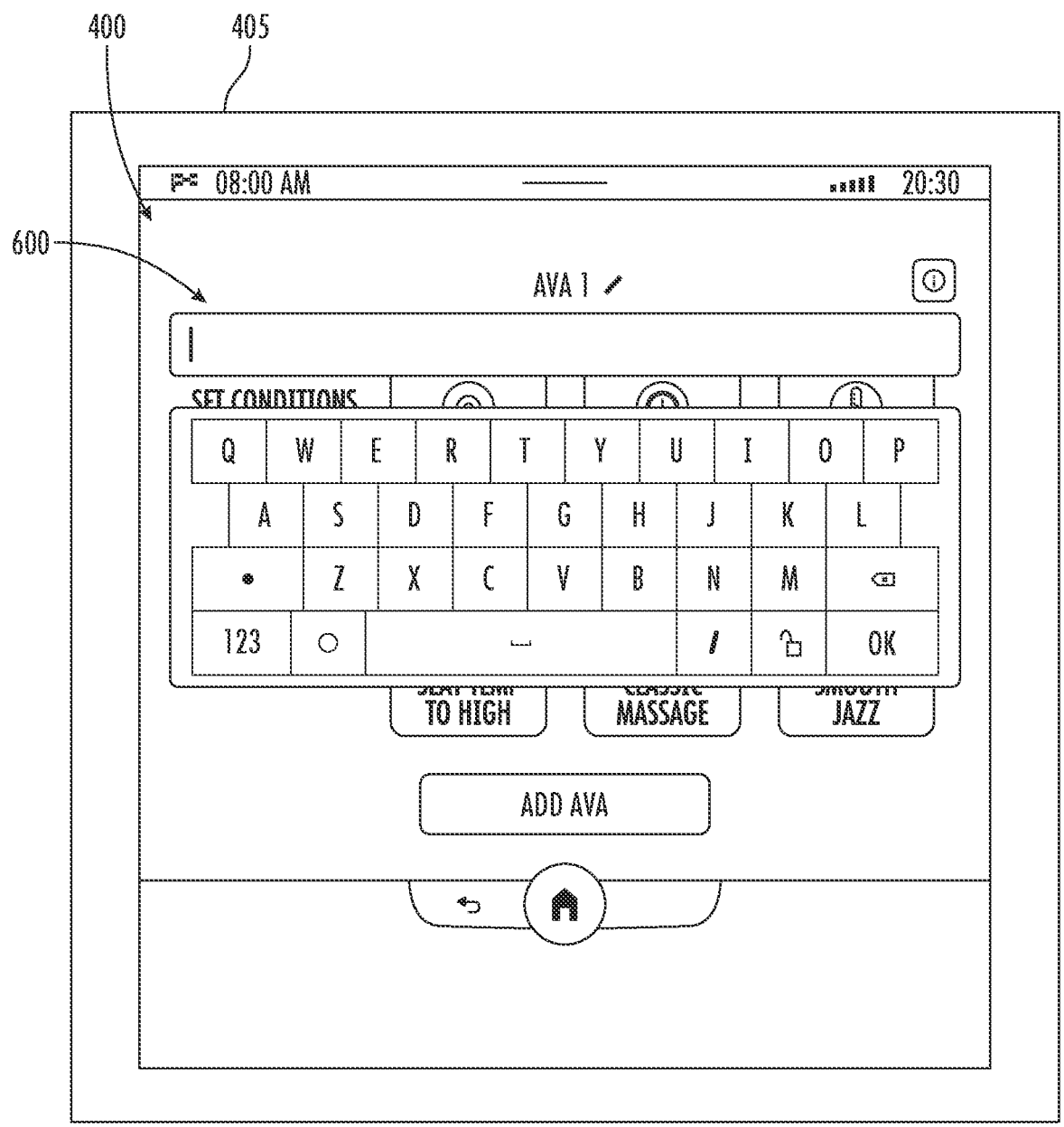

In an embodiment, the user 120 may interact with a user interface element 410 by touching the display device, clicking the element, etc. to cause the display of another user interface element that allows the user 120 to provide user input. For instance, as shown in FIG. 6, the user interface 400 may include a virtual keyboard 600 configured to allow the user 120 to enter one or more characters to define the triggering conditions. Additionally, or alternatively, the user interface 400 may include drop-down lists, toggles, range entry fields, etc.

Using the user interface 400, the user 120 may provide user input to specify the one or more triggering conditions for an automated vehicle action. For instance, the user 120 may interact with user interface elements 410 (or virtual keyboard 600) to indicate a location condition, a time condition, a temperature condition, or other types of triggering conditions (e.g., humidity, weather, traffic, outside noise level). A location condition may include a distance range/threshold from a particular point-of-interest (e.g., expressed as a lat./long. pair), a known location, a known navigational route, etc. A time condition may include a time range, a time-of-day, a stage of day (e.g., dawn, morning, midday, afternoon, dusk, evening, night), a day of the week, a week, a month, a certain date, or the like. A temperature condition may include a temperature range, a minimum temperature threshold, a maximum temperature threshold, or the like.

In an example, the user 120 may desire to set a location triggering condition for an automated vehicle action associated with the user's daily commute to work. The user 120 may provide user input (e.g., via the user interface 400) to indicate that the vehicle 105 is to be at the user's home or en route to the user's work as a triggering condition for implementing the automated vehicle action.

Additionally, or alternatively, the user may desire to set a time triggering condition for the automated vehicle action associated with the user's daily commute to work. The time triggering condition may indicate that the automated vehicle action is to be implemented when the user 120 starts driving the vehicle between 7:50-8:25 am, each day from Monday to Friday.

Additionally, or alternatively, the user may desire to set a temperature triggering condition for the automated vehicle action associated with the user's daily commute to work. The user 120 may provide user input (e.g., via the user interface 400) to indicate that the outside temperature is to be below 70 degrees Fahrenheit for the automated vehicle action to be implemented. The example triggering conditions 700A-C provided by the user 120 are shown in user interface 400, in FIG. 7.

With reference again to FIG. 4, the computing system 130 may receive, via the user interface 400, data indicative of user input specifying one or more settings of a vehicle function 165A-C. A setting may indicate a level, program, or state of a vehicle function 165A-C, which may be implemented when the triggering conditions are met. For instance, the user interface 400 may include one or more user interface elements 415 that allow the user 120 to provide user input to select one or more settings for one or more vehicle functions 165A-C. The user interface elements 415 may include a soft button, or other interactive user interface element, that allows the user 120 to provide user input associated with the settings. As described herein, a vehicle function may include: a window function, a seat function, a temperature function, an entertainment/music function, or another type of function. The seat function may include, for example, a seat temperature function, a seat ventilation function, or a seat massage function. In an example, the one or more settings of a vehicle function may be indicative of: an on/off state, an open/close state, a temperature level, a massage level, a music selection, a point-of-contact (e.g., telephone number), a navigational route, or another type of setting.

In an embodiment, the user 120 may interact with a user interface element 415 by touching the display device, scrolling over the element, etc. to cause the display of instructions or guidance associated with the user interface elements 415. By way of example, the user 120 may provide a touch input to at least one of the user interface elements 415 to cause the display of the informational element 505 shown in FIG. 5. The informational element 505 may include text that provides the user 120 with guidance on the types of input that may be provided via the user interface elements 415. This may include, for example, an explanation as to the type, number, etc. of settings that may be provided by the user 120 for a particular automated vehicle action.

In an embodiment, the user 120 may interact with a user interface element 415 by touching the display device, clicking the element, etc. to cause the display of another user interface element that allows the user 120 to provide user input to specify a setting. For instance, as shown in FIG. 6, the user interface 400 may include a virtual keyboard 600I configured to allow the user 120 to enter one or more characters to define the settings. Additionally, or alternatively, the user interface 400 may include drop-down lists, toggles, range entry fields, etc.

Figure 7:
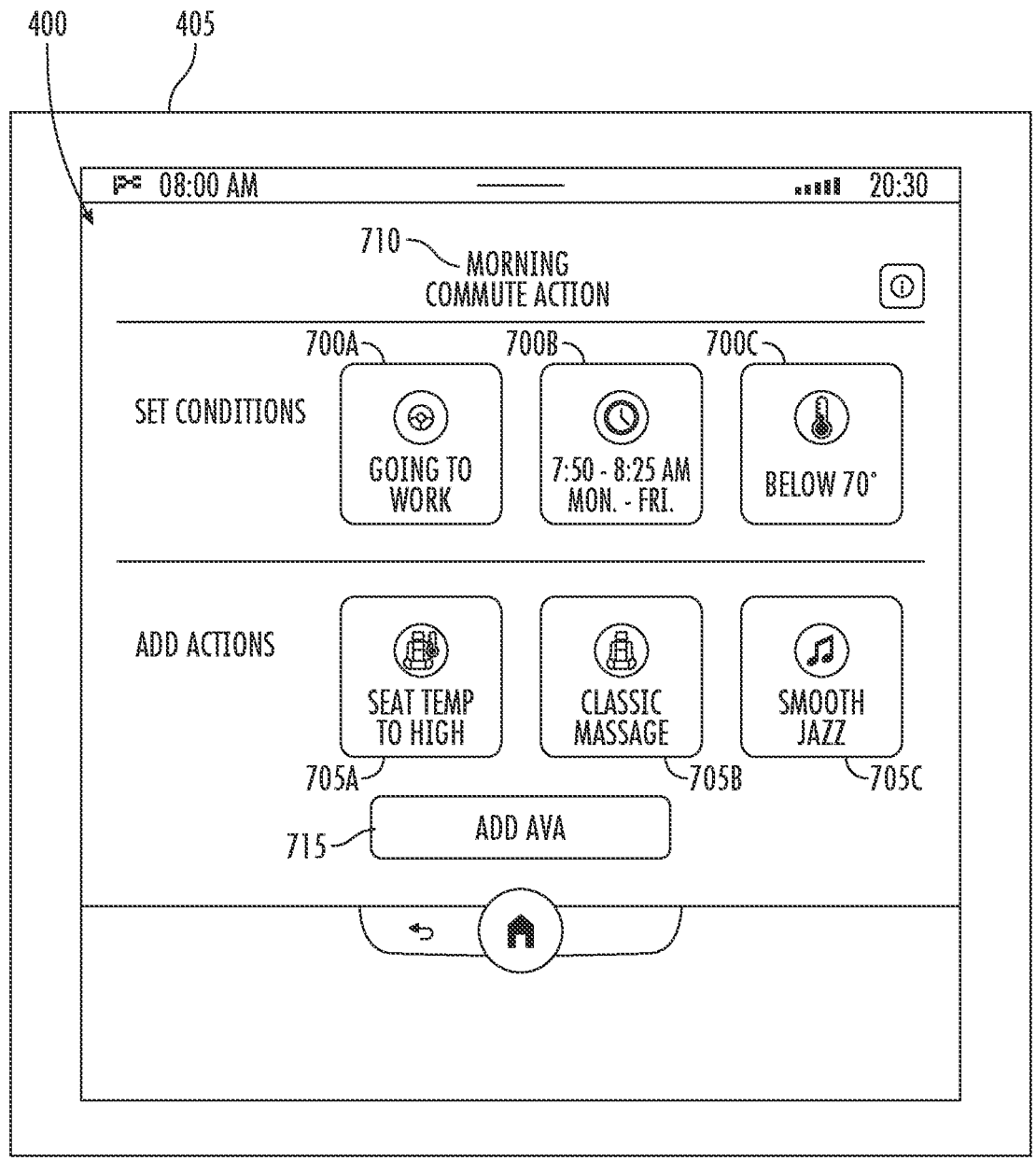

Using the user interface 400, the user 120 may provide user input to specify the one or more settings for an automated vehicle action. For instance, the user 120 may interact with user interface elements 410 (or virtual keyboard 600) to indicate one or more settings for one or more vehicle functions. For instance, as shown in FIG. 7, the user 120 may provide user input to indicate settings 705A-C. A first setting 705A may indicate that the seat temperature function is to be set to "high" when one or more of the triggering conditions 700A-B are met. A second setting 705B may indicate that the seat massage function is to be set to "classic massage" when one or more of the triggering conditions 700A-C are met. A third setting 705C may indicate that the music function is to be set to a radio station (or other music source) to play "smooth jazz" when one or more of the triggering conditions 700A-C are met.

In an embodiment, a respective setting 705A-C may be associated with one or more of the triggering conditions 700A-C. By way of example, the first setting 705A may be associated with triggering conditions 700A, 700B, and 700C such that the seat temperature function is set to "high" during the user's morning commute when all three triggering conditions are met. In another example, the second setting 705B may be respectively associated with triggering conditions 700A and 700B (but not 700C) such that the seat massage function is set to "classic massage" during the user's morning commute when the location and time conditions are met, regardless of the outside temperature.

With reference again to FIG. 4, in an embodiment, the computing system 130 may receive data indicative of a user-selected identifier for the automated vehicle action. For instance, the user interface 400 may include a user interface element 420 that is configured to allow the user 120 to provide a user-selected identifier for the automated vehicle action. The user-selected identifier may include, for example, a name that may be associated with the particular automated vehicle action.

In an embodiment, the user 120 may interact with a user interface element 420 by touching the display device, scrolling over the element, etc. to cause the display of instructions or guidance associated with the user interface elements 420. By way of example, the user 120 may provide a touch input to the user interface element 420 to cause the display of the informational element 510 shown in FIG. 5. The informational element 510 may include text that provides the user 120 with guidance on the types of input that may be provided via the user interface element 420. This may include, for example, a suggestion to name the particular automated vehicle action in a manner that is memorable for the user 120.

In an embodiment, the user 120 may interact with a user interface element 420 by touching the display device, clicking the element, etc. to cause the display of another user interface element that allows the user 120 to provide user input to enter the user-selected identifier for the automated vehicle action. For instance, as shown in FIG. 6, the user interface 400 may include a virtual keyboard 600 configured to allow the user 120 to enter a name for the automated vehicle action.

Using the user interface 400, the user 120 may provide user input to specify the user-selected identifier for the automated vehicle action. For instance, as shown in FIG. 7, the user 120 may provide user input to user interface elements 420 (or virtual keyboard 600), to indicate that the automated vehicle action is to be associated with a user-selected identifier 710 corresponding to a name "Morning Commute Action".

In an embodiment, the user interface 400 may include a user interface element 715 (also shown as user interface element 425 in FIG. 4) that allows the user 120 to submit the automated vehicle action. In an example, after reviewing the triggering conditions 700A-C and the settings 705A-C, the user 120 may interact with the user interface element 715 (e.g., a soft button) to submit the automated vehicle action for further analysis by the computing system 130.

Returning to FIG. 3, at (310), the computing system 130 may determine an automated vehicle action that defines a relationship between the one or more triggering conditions 700A-C and the one or more settings 705A-C of one or more vehicle functions 165A-C. The automated vehicle action may be considered a skill (or routine) of the vehicle 105 that describes the automated execution of a vehicle function 165A-C based on the context. The automated vehicle action may be indicative of the one or more settings 705A-C for the one or more vehicle functions 165A-C specified by the user 120, as well as the one or more triggering conditions 700A-C for automatically implementing the settings 705A-C.

As described herein, the automated vehicle action may indicate at least one of: when, where, or under what conditions, the vehicle 105 is to automatically control a vehicle function 165A-C in accordance with the one or more settings 705A-C. In an embodiment, the automated vehicle action may include a logic statement (e.g., an if/then statement) indicating that if the triggering conditions 700A-C are detected, then the vehicle 105 is to automatically control one or more of the vehicle functions 165A-C in accordance with the one or more settings 705A-C (e.g., to activate the respective setting).

In an example, the automated vehicle action designated "Morning Commute Action" may indicate that if the vehicle 105 is: (1) at (or nearby) the user's home or en route to the user's work, (ii) the time is between 7:50-8:25 am on a Monday, Tuesday, Wednesday, Thursday, or Friday; and (iii) the temperature is below 70 degrees Fahrenheit, then the vehicle 105 is to automatically activate the "high" setting of the seat temperature function. Additionally, or alternatively, the automated vehicle action designated "Morning Commute Action" may indicate that if the vehicle 105 is: (1) at (or nearby) the user's home or en route to the user's work, and (ii) the time is between 7:50-8:25 am on a Monday, Tuesday, Wednesday, Thursday, or Friday, then the vehicle 105 is to automatically activate the "classic massage" setting of the seat massage function and control the vehicle's entertainment system to play "smooth jazz".

With reference again to FIG. 3, at (315), the computing system 130 may determine whether a conflict between a newly generated automated vehicle action and a pre-existing automated vehicle action exists or does not exist. Such deconflicting may occur before presenting the automated vehicle action to the user 120 (e.g., for confirmation) or before storing the automated vehicle action in a database 215 for execution by the vehicle 105.

To perform the de-conflicting analysis, the computing system 130 may utilize a conflict analyzer 370. The conflict analyzer 370 may be implemented as a module of the computing system 130. The conflict analyzer 370 may be configured to determine whether an automated vehicle action conflicts with another pre-existing automated vehicle action (e.g., stored in database 215). A conflict may be determined to exist if it is not possible for the vehicle 105 to perform both automated vehicle actions without modifying one of them.

The conflict analyzer 370 may determine whether a conflict exists between automated vehicle actions in a variety of manners. In an embodiment, the conflict analyzer 370 may determine that a conflict exists in the event that two automated vehicle actions are assigned the same name. The conflict analyzer 370 may be configured to detect a name conflict using string comparison or substring check analysis.

In an embodiment, the conflict analyzer 370 may determine that a conflict exists between automated vehicle actions based on a domain associated with the context of the automated vehicle action or the vehicle function 165A-C to be controlled. Domains of conflict may be identified by which controller 170A-C (or ECUs) are associated with the performance of the automated vehicle actions. To the extent that the vehicle actions involve the same controller 170A-C (or ECU) and the controller 170A-C cannot concurrently implement both settings for a particular vehicle function, the computing system 130 may determine a conflict exists. For example, a climate-based automated vehicle action cannot simultaneously set the climate control temperature to maximum heat and maximum cool.

In an embodiment, the conflict analyzer 370 may determine whether a conflict exists between an automated vehicle action and an action being undertaken by the vehicle 105 because of a user's express command. For instance, the user 120 may provide an audio input (e.g., a spoken voice command) to the vehicle 105 to perform navigation guidance to a place of interest (e.g., a restaurant). The triggering conditions of the automated vehicle action may indicate that an automated navigation setting for guidance to the user's work would be executed at the same time. Accordingly, the conflict analyzer 370 may determine that there is a conflict between the voice-activated navigation and the automated vehicle action.

The computing system 130 may address a conflict based on one or more conflict resolution policies. The policies may be programmed to automatically resolve which of the automated vehicle actions is enabled and which is disabled. One example policy may include enabling the more recently determined automated vehicle action and disabling the other one. Another example policy may include enabling the automated vehicle action that is more likely to occur with higher frequency (e.g., during a morning commute) and disabling the other one (e.g., that is only activated during a particular season). Additionally, or alternatively, another example policy may include enabling or disabling automated vehicle actions based on a hierarchy of the automated vehicle actions. Additionally, or alternatively, another example policy may include favoring the setting of a vehicle function according to a user's express command over an automated vehicle action. Additionally, or alternatively, another example policy may include favoring an automated vehicle action created onboard the vehicle 105 (e.g., via computing system 130) over an automated vehicle action created offboard the vehicle 105 (e.g., via user device 115).

Additionally, or alternatively, an example policy may be configured to help resolve a conflict based on the context of the vehicle 105. For instance, a policy may be configured to prevent the activation of a certain function given the weather, traffic conditions, noise levels, or other current or future circumstances of the vehicle 105. By way of example, an automated vehicle action associated with opening a window (e.g., a sunroof) may not be activated if it is (or is predicted to be) raining, noisy, etc. A prediction for rain, elevated noise level, etc. may be determined based on data indicating future operating conditions of the vehicle 105 (e.g., weather data forecasting rain, route data shows a route through a noisy area). This may help resolve a conflict between automated vehicle actions by favoring an automated vehicle action that is more appropriate in light of the vehicle's context.

In an embodiment, if none of the policies implemented by conflict analyzer 370 automatically resolve the conflict, the user 120 may be presented with content on a user interface to manually resolve the conflict. For instance, in response to determining that a conflict does exist, the computing system 130 may generate a prompt for presentation to the user 120 via the user interface 400 of the display device 405. The prompt may request the user 120 to indicate whether to replace the pre-existing automated vehicle action with the new automated vehicle action (e.g., the "Morning Commute Action") or to discard the new automated vehicle action. A disabled automated vehicle action may remain disabled until, for example, it is manually adjusted by the user 120.

In an embodiment, the user 120 may select to edit at least a portion of the newly determined automated vehicle action and/or the pre-existing automated vehicle action. For instance, the user 120 may select to edit the "Morning Commute Action" to remove the music function setting to resolve a conflict with a pre-existing automated vehicle action that includes a conflicting music function setting.

Once the conflict analyzer 370 determines that no conflict exists, or that any conflicts are resolved, the conflict analyzer 370 may inform the vehicle action manager 220 that there are no conflicts with the automated vehicle action (e.g., the "Morning Commute Action"), at (320).

In an embodiment, after the conflict analysis, the computing system 130 may confirm the automated vehicle action with the user 120. To do so, the computing system 130 may generate content for presentation to the user 120 via a user interface 400 of a display device 405. The content may request for the user 120 to approve the automated vehicle action. The content may indicate the user-selected identifier 710 of the automated vehicle action, the one or more associated vehicle functions 165A-C, the one or more settings 705A-C, and the one or more triggering conditions 700A-C associated with the automated vehicle action. The content may be provided via the display device onboard the vehicle 105 and/or the display device of the user device 115. The user 120 may interact with the user interface 400 to confirm that the user 120 desires for the computing system 130 to create the automated vehicle action.

At (325), the computing system 130 may persist the automated vehicle action. To do so, the computing system 130 may output command instructions based on the automated vehicle action. The computing system 130 may output command instructions for the vehicle 105 to implement the automated vehicle action (e.g., the "Morning Commute Action") for automatically controlling the vehicle function 165A-C based on whether the vehicle 105 detects the one or more triggering conditions 700A-C. The command instructions may be computer-executable instructions for the vehicle 105 to implement the automated vehicle action for automatically controlling one or more vehicle functions 165A-C in accordance with the one or more settings 705A-C based on whether the vehicle 105 detects the one or more triggering conditions 700A-C.

In an embodiment, the computing system 130 may store the command instructions in an accessible memory on the vehicle 105 for execution at a subsequent time. For example, the command instructions may be stored in the automated vehicle action database 215 with the command instructions associated with other automated vehicle actions. The database 215 may be updated as new automated vehicle actions are created, existing automated vehicle actions are changed, disabled, enabled, etc.

In an embodiment, various components of the computing system 130 may be informed of the persistence of the automated vehicle action. For instance, at (330), the vehicle action manager 220 may be informed that the "Morning Commute Action" has been created so that the vehicle action manager 220 may manage the implementation of this automated vehicle action. Additionally, or alternatively, at (335), the vehicle embedded service 225 may be informed of the creation of the "Morning Commute Action".

In an embodiment, at (340), the user 120 may be informed of the creation of the "Morning Commute Action". For instance, the computing system 130 may generate content for presentation to the user 120 via a user interface of a display device. The content may include a notification indicating: "The Morning Commute Action Has Been Created". This notification may be presented via a display device 405 of the vehicle 105 or the user device 115.

At (345), the computing system 130 may begin to monitor for the triggering conditions 700A-C. To do so, the computing system 130 may use a context observer 375. The context observer 375 may be implemented as a module of the computing system 130 (e.g., of the vehicle embedded service 225). The context observer 375 may be configured to monitor signals from onboard the vehicle 105 to detect the occurrence of the one or more triggering conditions 700A-C. Data indicative of the triggering conditions 700A-C may be provided to (or accessed by) the context observer 375 to refresh the context observer 375. In this way, the context observer 375 may remain up to date on which triggering conditions the context observer 375 is to be monitoring for.

The computing system 130 (e.g., the context observer 375) may detect an occurrence of the one or more triggering conditions 700A-C. The detection may be based on signals produced by the vehicle function services 205A-C, one more sensors (e.g., thermometer), or one or more other components of the vehicle 105 (e.g., internal clock, positioning system 155). The signals may encode data indicative of the triggering conditions 700A-C. In an example, the signals may indicate that the vehicle 105 is at the home of the user 120 or following a route to the user's work. The route may be one that the user 120 requested (e.g., through the vehicle's navigation function) or that the vehicle computing system 130 recognizes as a route frequently travelled by the vehicle 105 to arrive at the user's place of work. In another example, the signals may indicate that the time is 8:05 am and the day is a Monday. In another example, the signals may indicate that the outside temperature is 62 degrees Fahrenheit.

Based on the signals, the computing system 130 may determine the occurrence of the triggering conditions 700A-C. For instance, the computing system 130 may analyze the information encoded in the signals to determine that the location triggering condition 700A has occurred because the vehicle 105 is likely going to the user's work. The computing system 130 may determine that the time triggering condition 700B has occurred because the time 8:05 am is between 7:50-8:25 am and it is a Monday. The computing system 130 may determine that the temperature triggering condition 700C has occurred because the temperature 62 degrees Fahrenheit is below the 70 degrees Fahrenheit threshold.

Based on the triggering conditions 700A-C, the computing system 130 may transmit one or more signals to implement the automated vehicle action. More particularly, the computing system 130 (e.g., the vehicle embedded service 225) may transmit one or more signals to implement the one or more settings 705A-C of the one or more vehicle functions 165A-C associated with the "Morning Commute Action". The signals may be transmitted to a controller 170A-C that is configured to activate/adjust the vehicle function 165A-C to the settings 705A-C. In an example, the computing system 130 may transmit a signal to a seat temperature function to activate the "high" heat setting, a signal to a controller of the seat massage function to activate the "classic massage" setting, and a signal to a controller of the entertainment function to play "smooth jazz".

In an embodiment, the computing system 130 may generate content (e.g., a notification) indicating that the vehicle 105 is implementing or has implemented the automated vehicle action. The content may be presented to the user 120 via a user interface of a display device (e.g., of the vehicle's infotainment system).

Figure 8:
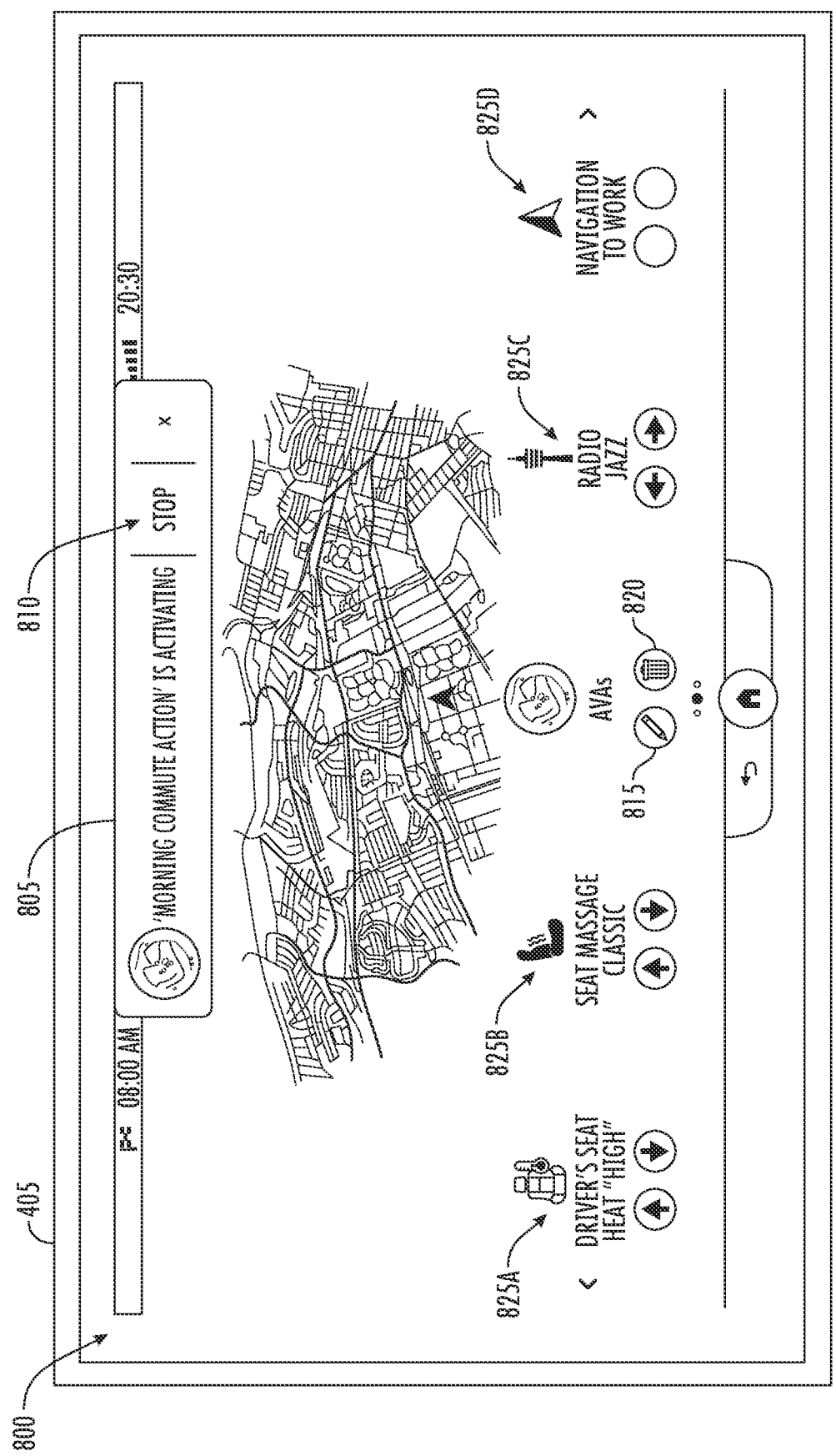

FIG. 8 illustrates a diagram of an example user interface 800 on the example display device 405 according to an embodiment hereof. The user interface 800 may include a user interface element 805 that notifies the user 120 of the automated vehicle action that is being automatically activated by the vehicle 105. In an embodiment, the user interface 800 may include a user interface element 810 (e.g., soft button) that the user 120 may interact with to stop, snooze or delay (e.g., for implementation at another time), or cancel the implementation of the automated vehicle action. Additionally, or alternatively, the user interface 800 may include one or more user interface elements 815, 820 that are configured to allow the user 120 to edit the automated vehicle action or to disable or delete the automated vehicle action. Editing the automated vehicle action may include changing one or more of the triggering conditions, one or more of the settings, or one or more of the associated vehicle functions.

In an embodiment, the user interface 800 may include one or more user interface elements 825A-D that indicate vehicle functions that are active. In an embodiment, the user interface elements 825A-C may indicate the vehicle functions that are being activated or controlled for the automated vehicle action (e.g., the "Morning Commute Action"). In an embodiment, the user interface 800 may include a user interface element 825D that indicates a vehicle function that is active (e.g., the navigation function) but may not be a vehicle function designated for automatic control in association with the automated vehicle action. In an embodiment, the user interface elements 825A-D may allow the user 120 to provide user input to change the setting of the associated vehicle function. This may include, for example, increasing or decreasing a seat temperature setting.

Returning to FIG. 3, at (350), the computing system 130 may facilitate the synchronization of automated vehicle actions. This may occur before, during, or after the automated vehicle action is implemented onboard the vehicle 105. To help synchronize automated vehicle actions, the computing system 130 may communicate with the computing platform 110 (e.g., cloud embedded service 235). For instance, the computing system 130 (e.g., the vehicle action manager 220) may transmit, over a network to a server system, a communication indicative of the command instructions associated with the automated vehicle action for storage in association with a user profile 230 of the user 120.

The computing platform 110 may be configured to aggregate a plurality of automated vehicle actions for a particular user 120. In an embodiment, the computing platform 110 may store the command instructions for each automated vehicle action in one or more collections for indexing automated vehicle actions. A respective collection may include the collections of user-selected settings, triggering conditions, etc.

For example, FIGS. 9A-B illustrate data structures 900A-B that include a plurality of automated vehicle actions. The data structure 900A may be, for example, a table, list, etc. that indexes the respective automated vehicle actions 905A-C. The automated vehicle actions 905A-C may be represented as objects that store setting objects and triggering condition objects. The objects may also maintain a set of metadata for uniquely identifying the automated vehicle action such as a serial number, a unique identifier, an assigned name, etc. In an embodiment, automated vehicle actions 905A-C may be stored or indexed according to the type of action (e.g., ClimateControlAction, NavigationRouteAction). In an embodiment, an automated vehicle action 905A-C may be associated with an action affinity that defines the responsibilities of the computing system 130 (e.g., the vehicle embedded service 225), the computing platform 110 (e.g., the cloud embedded service 235), or the user device 115 for a particular automated vehicle action 905A-C.

The automated vehicle actions 905A-C (e.g., the command instructions associated therewith) may be stored in association with a user profile of a user. For example, the data structure 900A may store automated vehicle actions 905A-C and may be associated with a first user profile 230 associated with a first user 120. The automated vehicle actions 905A-C may be those that were created based on user input provided by the first user 120 (e.g., using the technology described herein). The data structure 900B may store automate vehicle actions 950A-C and may be associated with a second user profile 260 associated with a second user 175 (shown in FIG. 1). The automated vehicle actions 950A-C may be those that were created based on user input provided by the second user 175 (e.g., using the technology described herein). In this way, the automated vehicle actions 905A-C, 950A-C may be aggregated in a manner that indicates which automated vehicle actions 905A-C, 950A-C are associated with which respective users 120, 175.

In an embodiment, the automated vehicle actions 905A-C associated with a particular user 120 may be aggregated from a plurality of different computing sources. For instance, the computing platform 110 may be configured to aggregate the automated vehicle actions 950A-C that were generated by one or more vehicles, one or more user devices, a cloud platform 110, or another computing source. In an example, a first automated vehicle action 905A may be generated by the computing system 130 of a first vehicle 105 based on user input provided via a user interface 400 presented on a display device onboard the first vehicle 105. A second automated vehicle action 905B may be generated by the user device 115 based on user input provided via a user interface 250 presented on a display device of the user device 115. A third automated vehicle action 905C may be generated by a computing system of a second vehicle 180 (shown in FIG. 1) based on user input provided via a user interface presented on a display device onboard the second vehicle 180. The computing platform 110 may aggregate the first, second, and third automated vehicle actions 905A-C from these three separate sources in the data structure 900A for the first user 120. The aggregated automated vehicle actions 905A-C may be associated with a user profile 230 of the first user 120. This may allow the computing platform 110 to more efficiently retrieve the automated vehicle actions 905A-C for the first user 120.

In an embodiment, the computing platform 110 may aggregate automated vehicle actions that were generated based on user input with those generated via artificial intelligence running onboard a vehicle. For instance, the first automated vehicle action 905A may be generated by the computing system 130 of the vehicle 105 based on user input from the user 120, as described herein. The third automated vehicle action 905C may be generated by the computing system of a vehicle or the cloud platform 110 using one or more machine-learned models according to the systems and methods disclosed in U.S. patent application Ser. No. 18/081,318 filed Dec. 14, 2022, the disclosure of which is incorporated herein by reference in its entirety. The first automated vehicle action 905A generated based on user input may be aggregated and stored (e.g., in data structure 900A) with the third automated vehicle action 905C generated based on the machine-learned models.

In an embodiment, the automated vehicle actions 905A-C for a user 120 may be transferrable to a plurality of different vehicles. In an example, the user 120 may enter a second vehicle 180. A computing system of the second vehicle 180 may provide, to the computing platform 110, data indicating that the user 120 has entered the second vehicle 180. In an embodiment, this may include a request for the automated vehicle actions associated with the user 120. The computing platform 110 may receive the data indicative of the user 120 and retrieve the aggregated automated vehicle actions 905A-C associated with the user 120. The computing platform 110 may provide the second vehicle 180 with data indicative of the command instructions for the automated vehicle actions 905A-C associated with the user profile 230 of the user 120. Accordingly, the user 120 may experience the automated vehicle actions generated via a first vehicle 105 (or user device 115) while in a second vehicle 180.

Figure 10A:
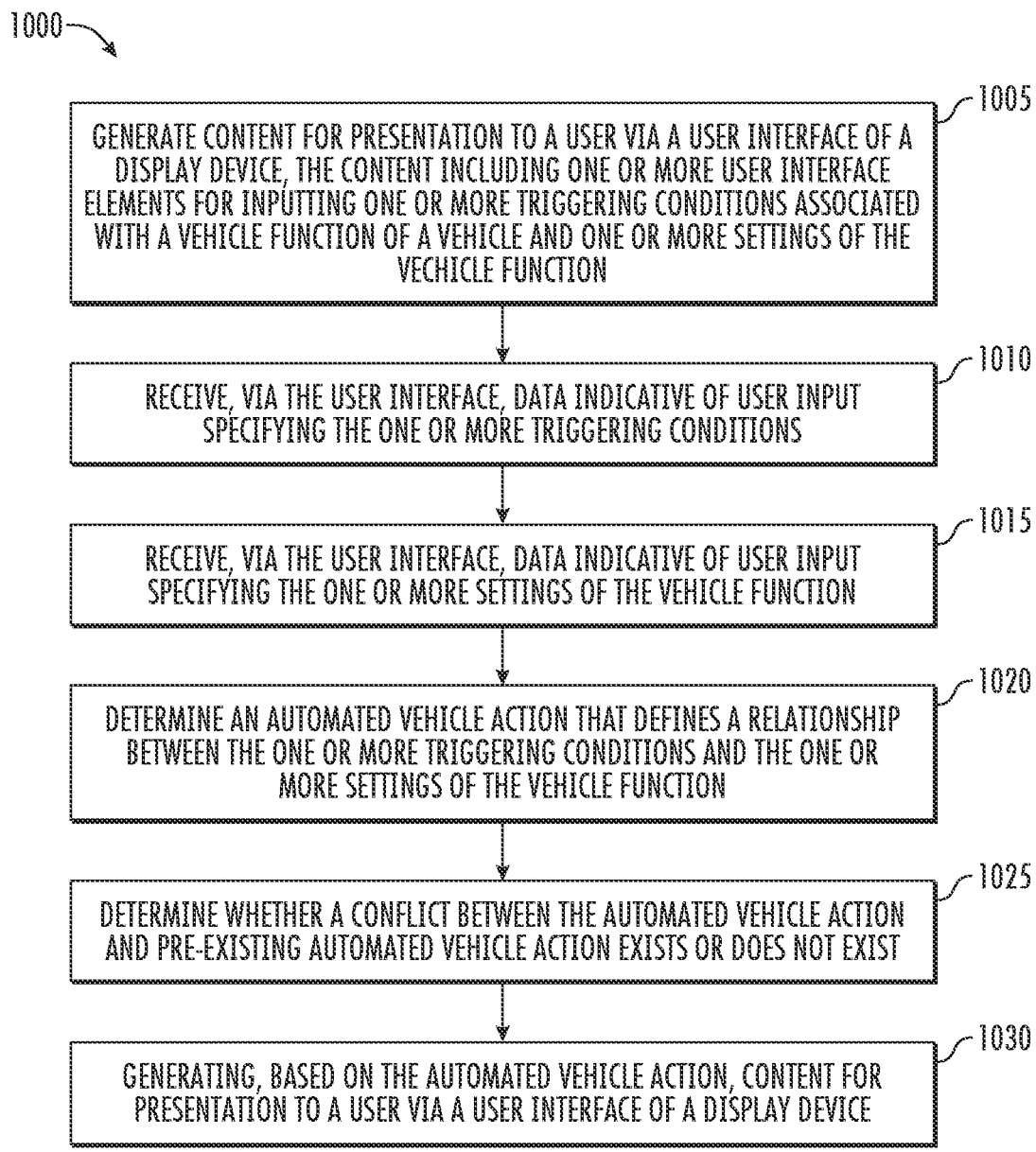
FIGS. 10A-B illustrate a flowchart diagram of an example method for generating automated vehicle actions for a user according to an embodiment hereof.
Figure 10B:
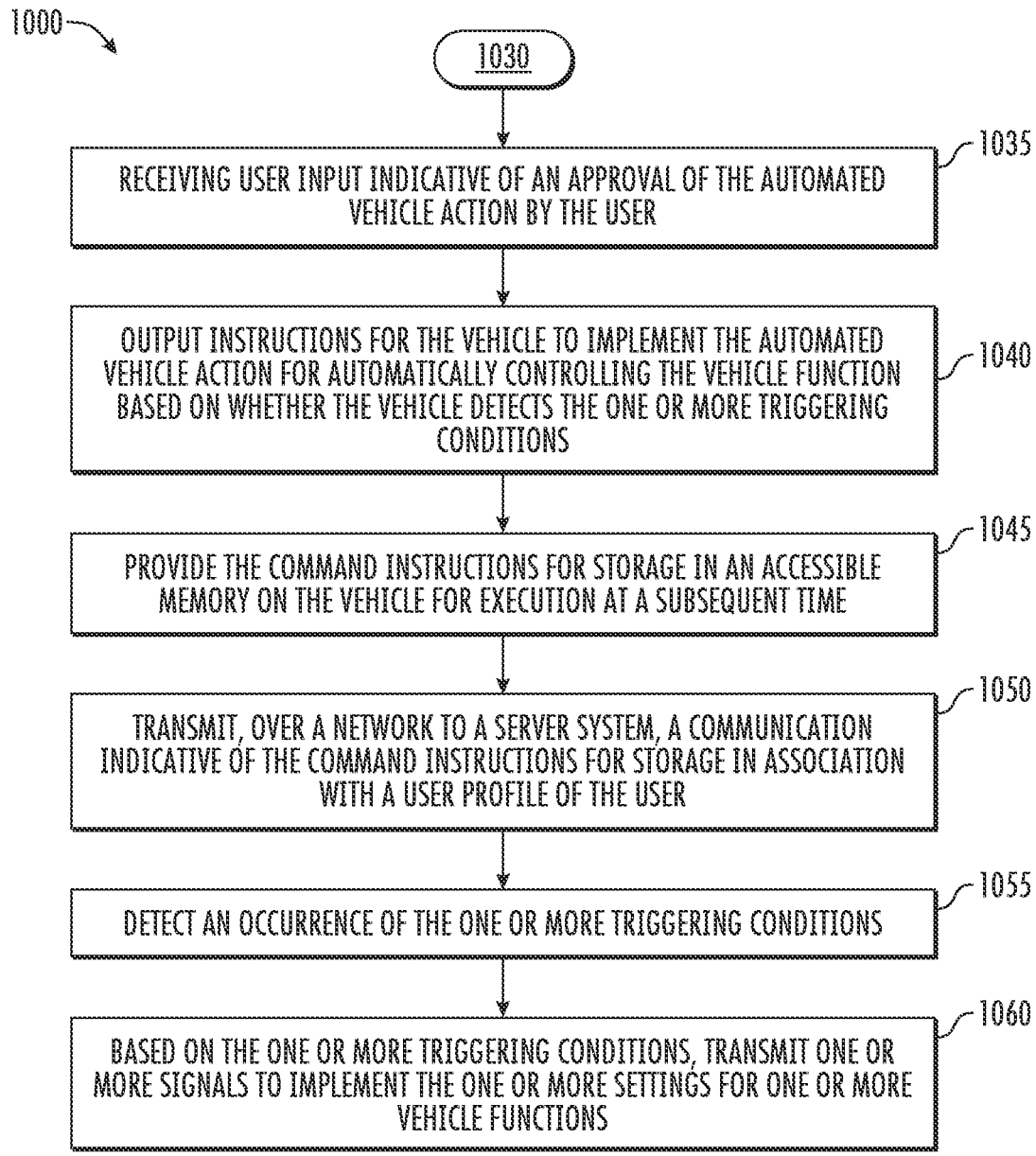

FIGS. 10A-B illustrate flow diagrams that depict an example method 1000 for generating automated vehicle actions according to an embodiment hereof. The method 1000 may be performed by a computing system described with reference to the other figures. In an embodiment, the method 1000 may be performed by the control circuit 135 of the computing system 130 of FIG. 1. One or more portions of the method 1000 may be implemented as an algorithm on the hardware components of the devices described herein (e.g., as in FIGS. 1-8 and 12), for example, to generate automated vehicle actions as described herein. For example, the steps of method 1000 may be implemented as operations/instructions that are executable by computing hardware.

FIGS. 10A-B illustrate elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIGS. 10A-B are described with reference to elements/terms described with respect to other systems and figures for example illustrated purposes and is not meant to be limiting. One or more portions of method 1000 may be performed additionally, or alternatively, by other systems. For example, one or more portions of the method 1000 may also, or alternatively, be performed by the user device 115 (e.g., a control circuit thereof) or control circuit 185 of the computing platform 110 of FIG. 1.

In an embodiment, the method 1000 may begin with or otherwise include a step 1005, in which the computing system 130 generates content for presentation to a user 120 via a user interface 400 of a display device 405. The user 120 may be a user of a vehicle 105 such as, for example, a driver or a passenger. The content may include one or more user interface elements 410, 415 for inputting one or more triggering conditions 700A-C associated with a vehicle function 165A-C of the vehicle 105 and one or more settings 705A-C of the vehicle function 165A-C. In an embodiment, the display device 405 may be a display screen of the vehicle 105. This may include a touch screen of an interactive dashboard or onboard infotainment system. In an embodiment, the display device 405 may be a display screen of a mobile user device. This may include, for example, a touch screen of a mobile phone.

As described herein, the user 120 may provide user input associated with various vehicle functions 165A-C onboard the vehicle 105. This includes, for instance, a window function, a seat function, a temperature function, or an entertainment function (e.g., music function). This may also include a communication function (e.g., onboard phone function), personal assistance function, navigation function, or other vehicle functions. In an embodiment the seat function may include multiple seat-related functions. For instance, the seat function may include a seat temperature function, a seat ventilation function, or a seat massage function.

The method 1000 in an embodiment may include a step 1010, in which the computing system 130 receives, via the user interface 400, data indicative of user input specifying the one or more triggering conditions 700A-C. As described herein, the triggering conditions 700A-C may indicate the context under which the vehicle function 165A-C is to be automatically controlled by the vehicle 105. The triggering conditions 700A-C may include a location triggering condition, a time triggering condition, a temperature triggering condition, a weather triggering condition (e.g., rain, humidity level, snow), a traffic triggering condition (e.g., traffic density, traffic levels), a noise triggering condition (e.g., noise levels in the surrounding environment of the vehicle 105), or other types of triggering conditions.

The user 120 may interact with the user interface 400 to provide user input indicative of the triggering conditions 700A-C. For instance, the user 120 may provide a touch input to at least one user interface element 410 of the user interface 400 to cause the display device to render an input element (e.g., virtual keyboard). The user 120 may provide a touch input to the input element to indicate the triggering conditions 700A-C. This may include a location triggering condition 700A specifying a threshold distance from the user's home (e.g., expressed as a lat./long. coordinate pair) or that the vehicle 102 is to be traveling to a particular location (e.g., the user's work). Additionally, or alternatively, the triggering conditions 700A-C may include a time triggering condition 700B indicating a time range. Additionally, or alternatively, the triggering conditions 700A-C may include a temperature triggering condition 700C indicating a temperature threshold, range, etc.

The method 1000 in an embodiment may include a step 1015, in which the computing system 130 receives, via the user interface 400, data indicative of user input specifying the one or more settings 705A-C of the vehicle function 165A-C. The settings 705A-C may indicate the user's preferred setting, program, level, etc. of the vehicle function 165A-C to be activated based on the context (e.g., the occurrence of the triggering conditions 700A-C). As described herein, the settings 705A-C may be indicative of at least one of: (i) an on/off state, (ii) an open/close state, (iii) a temperature level, (iv) a massage level, or (v) a music selection. In an example, the user 120 may provide user input (e.g., a touch input to the user interface 400, a voice input) specifying: a "high" heat setting of a seat temperature function, a "classic massage" setting of a seat massage function, and a "smooth jazz" setting of an entertainment/music function.

The method 1000 in an embodiment may include a step 1020, in which the computing system 130 determines an automated vehicle action that defines a relationship between the one or more triggering conditions 700A-C and the one or more settings 705A-C of the vehicle function 165A-C. The automated vehicle action may indicate at least one of: (i) when, (ii) where, or (iii) under what conditions (e.g., temperature, traffic, weather, noise, other conditions), the vehicle 105 is to automatically control the vehicle function 165A-C in accordance with the one or more settings 705A-C. As described herein, the automated vehicle action may include an if/then statement indicating that if the location, time, and triggering conditions 700A-C are detected, then the vehicle 105 is to automatically control the seat heating function, the seat massage function, and the entertainment function to respectively implement the "high" heat setting for the seat temperature, the "classic massage" setting for the seat massager, and adjust a vehicle radio (or other source) to play "smooth jazz". In an embodiment, the user 120 may provide a name for the automated vehicle action (e.g., "Morning Commute Action").

The method 1000 in an embodiment may include a step 1025, in which the computing system 130 determines whether a conflict between the automated vehicle action and a pre-existing automated vehicle action exists or does not exist. In an embodiment, the computing system 130 may compare the triggering conditions 700A-C of the new automated vehicle action (e.g., the "Morning Commute Action") and the pre-existing automated vehicle action to determine if the actions could be triggered concurrently. If so, the computing system 130 may compare the settings of the newer automated vehicle action and the settings of the pre-existing automated vehicle action to determine whether the settings may be implemented concurrently. Settings may not be implemented concurrently, for example, if an associated controller (or ECU) could not activate the settings during an overlapping time period. By way of example, a controller 170B for a seat massage function of a driver's seat may be programmed to only activate one massage setting at a time. Thus, the controller 170B may not be able to activate the "classic massage" setting of the new automated vehicle action and the "gentle massage" setting of a pre-existing automated vehicle action in the event these actions could be triggered by the same conditions.

The method 1000 in an embodiment may include a step 1030, in which the computing system 130 generates, based on the automated vehicle action, content for presentation to a user 120 via a user interface 400 of a display device 405. In an embodiment, in response to determining a conflict does exist, the computing system 130 may generate a prompt for presentation to the user 120 via the user interface 400 of the display device 405. The prompt may indicate that the automated vehicle action conflicts with a pre-existing automated vehicle action and requests the user 120 to adjust at least one triggering condition 700A-C or setting 705A-C. Additionally, or alternatively, the prompt may request the user 120 to indicate whether to replace the pre-existing automated vehicle action with the new automated vehicle action or to discard the new automated vehicle action.

In an embodiment, the content may present a prompt requesting approval or confirmation of the automated vehicle action by the user 120. The prompt may indicate the one or more vehicle functions 165A-C, the settings 705A-C, triggering conditions 700A-C, and/or name associated with the automated vehicle action. In an embodiment, the user 120 may interact with the user interface element 400 to confirm the triggering conditions 700A-C, the settings 705A-C, or the name.

With reference now to FIG. 10B, the method 1000 in an embodiment may include a step 1035, in which the computing system 130 receives user input indicative of an approval of the automated vehicle action by the user 120. As described herein, the user input may include a touch input to a user interface element, a voice command, etc. In an embodiment, the user 120 may reject or elect to discard the automated vehicle action. In the event of a rejection, the method 1000 may return to step 1005.

The method 1000 in an embodiment may include a step 1040, in which the computing system 130 outputs command instructions for the vehicle 105 to implement the automated vehicle action for automatically controlling one or more vehicle functions 165A-C based on whether the vehicle 105 detects the one or more triggering conditions 700A-C. The command instructions may include computer-executable instructions that cause the computing system 130 to monitor for the triggering conditions 700A-C (e.g., time, location, temperature, etc.) specified by the user 120 and, if detected, implement the one or more settings 705A-C specified by the user 120 (e.g., activating the "high" heat seat setting, the "classic massage" setting, playing "smooth jazz").

The method 1000 in an embodiment may include a step 1045, in which the computing system 130 provides the command instructions for storage in an accessible memory on the vehicle 105 for execution at a subsequent time. For instance, the command instructions may be stored in a memory onboard the vehicle 105 (e.g., the automated vehicle action database 215). The command instructions may be executed (e.g., to activate the settings 705A-C) at a later time when, for example, the triggering conditions 700A-C are detected.

The method 1000 in an embodiment may include a step 1050, in which the computing system 130 transmits, over a network to a server system, a communication indicative of the command instructions for storage in association with a user profile 230 of the user 120. As described herein, the command instructions may be provided to a computing platform 110 (e.g., a cloud-based server system). The computing platform 110 may store the command instructions in a memory offboard the vehicle 105 (e.g., cloud database 240). The command instructions may be stored in association with the user profile 230 of the user 120 such that the user's automated vehicle actions (aggregated from multiple sources) may be transferred from the computing platform 110 to one or more other vehicles, if desired. For instance, the computing platform 110 may transmit data indicative of the automated vehicle actions to another vehicle (different than vehicle 105), such that the other vehicle may implement the automated vehicle actions even though they were created via another vehicle (e.g., vehicle 105).

The method 1000 in an embodiment may include a step 1055, in which the computing system 130 detects an occurrence of the one or more triggering conditions 700A-C. For instance, the computing system 130 may capture data from the sensors 150 (e.g., thermometer) of the vehicle 105 or other systems/devices onboard the vehicle 105 (e.g., clock, positioning system 155) to determine whether the triggering conditions 700A-C for the automated vehicle action occur.

The method 1000 in an embodiment may include a step 1060, in which the computing system 130, based on the one or more triggering conditions 700A-C, transmits one or more signals to implement the one or more settings 705A-C for one or more vehicle functions 165A-C. In an example, if the computing system 130 detects the occurrence of a defined set of time, temperature, and location conditions, then the computing system 130 may automatically transmit a signal to a controller to indicate that the seat massage function is to be set to "classic massage". The computing system 130 may automatically transmit a signal to a controller to indicate the seat temperature function is to be set to "high" and a signal to a controller to tune a radio or access another music source to play "smooth jazz".

Figure 11A:
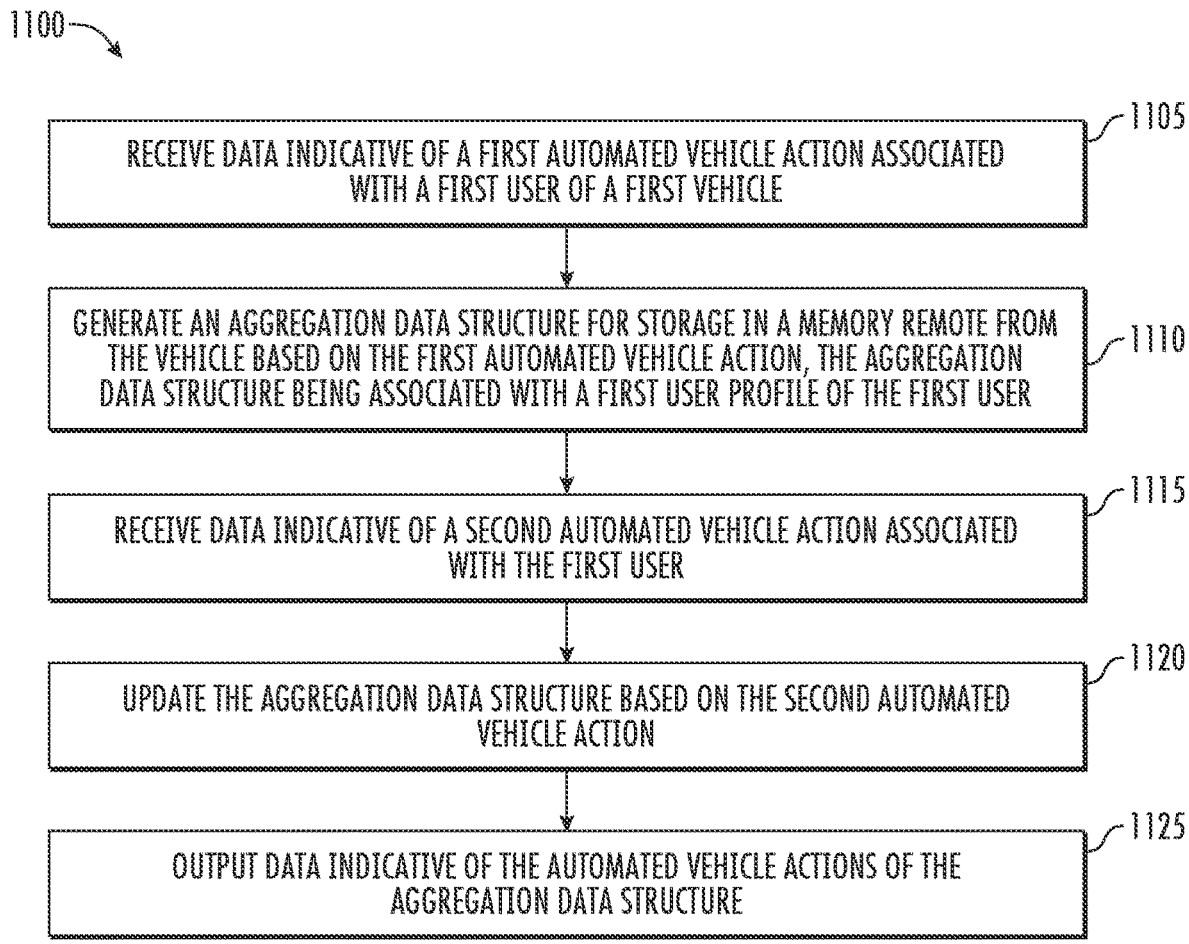
FIG. 11A illustrates a flowchart diagram of an example method for synchronizing automated vehicle actions according to an embodiment hereof.

FIG. 11A illustrates a flowchart diagram of an example method 1100 for aggregating automated vehicle actions for a user according to an embodiment hereof. The method 1100 may be performed by a computing system described with reference to the other figures. In an embodiment, the method 1100 may be performed by the control circuit 185 of the computing platform 110 of FIG. 1. One or more portions of the method 1100 may be implemented as an algorithm on the hardware components of the devices described herein (e.g., as in FIGS. 1-8 and 12). For example, the steps of method 1100 may be implemented as operations/instructions that are executable by computing hardware.

FIG. 11A illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 11A is described with reference to elements/terms described with respect to other systems and figures for example illustrated purposes and is not meant to be limiting. One or more portions of method 1100 may be performed additionally, or alternatively, by other systems. For example, one or more portions of the method 1100 may also, or alternatively, be performed by the control circuit 135 of the computing system 130 of FIG. 1.

In an embodiment, the method 1100 may begin with or otherwise include a step 1105, in which the computing platform 110 receives data indicative of a first automated vehicle action 905A associated with a first user 120 of a first vehicle 105. The data indicative of the first automated vehicle action 905A may be transmitted from the computing system 130 of the first vehicle 105 after the first automated vehicle action 905A is generated by the computing system 130 based on user input from the user 120. The data indicative of the first automated vehicle action 905A may include a name of the automated vehicle action, one or more associated vehicle functions, one or more triggering conditions, and one or more user-specific settings. The data indicative of the first automated vehicle action 905A may also include encrypted pseudonymized data that may be decrypted by the computing platform 110 to identify the first user 120 by, for example, a series of random characters assigned to the first user 120, while also protecting the user's information.

The method 1100 in an embodiment may include a step 1110, in which the computing system 130 generates an aggregation data structure 900A for storage in a memory remote from the first vehicle 105 based on the first automated vehicle action 905A. The aggregation data structure 900A may be associated with a first user profile 230 of the first user 120.

In an example, the computing platform 110 may generate a table or list data structure that includes a plurality of rows, each including a plurality of data fields. The information associated with the first automated vehicle action 905A may be stored in the data fields of an assigned row. As illustrated in FIG. 9A, this may include an identifier for the first automated vehicle action 905A, a name, vehicle functions, triggering conditions, and settings associated therewith. The computing platform 110 may generate a link or other data connection to the first user profile 230 of the first user 120 to associate the aggregation data structure 900A with the first user profile 230. In an embodiment, the aggregation data structure 900A (or a copy thereof) may be stored within the first user profile 230. The aggregation data structure 900A may be configured to store a plurality of automated vehicle actions 905A-C associated with the first user 120.

The method 1100 in an embodiment may include a step 1115, in which the computing system 130 receives data indicative of a second automated vehicle action 905B associated with the first user 120. The data indicative of the second automated vehicle action 905B may include a name of the second automated vehicle action 905B, one or more associated vehicle functions, one or more triggering conditions, and one or more user-specified settings. The data indicative of the second automated vehicle action 905B may also include encrypted pseudonymized data that may be decrypted by the computing platform 110 to associate the second automated vehicle action 905B with the first user 120.

The second automated vehicle action 905B may have been generated based on user input provided to a computing source that is different than the first automated vehicle action 905A. In an embodiment, the second automated vehicle action 905B may be generated by a computing system of a second vehicle 180 based on user input provided by the first user 120 to a display device of the second vehicle 180. Additionally, or alternatively, the second automated vehicle action 905B may be generated by a user device 115 based on user input provided by the first user 120 to the user device 115.

In an embodiment, the first automated vehicle action 905A or the second automated vehicle action 905B may be generated by one or more machine-learned models. For instance, the second automated vehicle action 905B may be generated by the computing system 130 of the first vehicle 105. As such, the triggering conditions and settings of the second automated vehicle action 905B may have been automatically determined by the computing system 130 rather than specified via user input from the first user 120.

The method 1100 in an embodiment may include a step 1120, in which the computing system 130 updates the aggregation data structure 900A based on the second automated vehicle action 905B. For instance, the computing platform 110 may adjust the aggregation data structure 900A to include the second automated vehicle action 905B. In an embodiment, this may include adding a row in the aggregation data structure 900A for the second automated vehicle action 905B and entering data in the data fields of the row to reflect the identifier, name, vehicle functions, triggering conditions, settings, etc. of the second automated vehicle action 905B.

In an embodiment, the aggregation data structure 900A may allow the computing platform 110 to aggregate automated vehicle actions for the first user 120 from a plurality of different sources. In an example, as described herein, the second automated vehicle action 905B may be from a source that is different from the first automated vehicle action 905A (e.g., another vehicle, a user device, etc.). In another example, the second automated vehicle action 905B may be generated automatically using one or more models and the first automated vehicle action 905A may be generated based on specific user input from the first user 120. In this way, the computing platform 110 may generate and utilize the aggregation data structure 900A to aggregate automated vehicle actions for the first user 120 regardless of the computing source or the technology used to create them.

The method 1100 in an embodiment may include a step 1125, in which the computing platform 110 outputs data indicative of the automated vehicle actions of the aggregation data structure 900A. In an example, the first user 120 may enter a second vehicle 180. As described herein, a computing system of the second vehicle 180 may request the automated vehicle actions associated with the first user 120 from the computing platform 110. The computing platform 110 may access the aggregation data structure 900A and retrieve data indicative of the aggregated automated vehicle actions stored therein. For instance, the computing platform 110 may retrieve data indicative of the first automated vehicle action 905A and the second automated vehicle action 905B and transmit such data to the computing system of the second vehicle 180. The first and second automated vehicle actions 905A-B (or command instructions associated therewith) may be stored locally onboard the second vehicle 180 so that the second vehicle 180 may implement the actions (e.g., upon the detection of the triggering conditions).

Figure 11B:
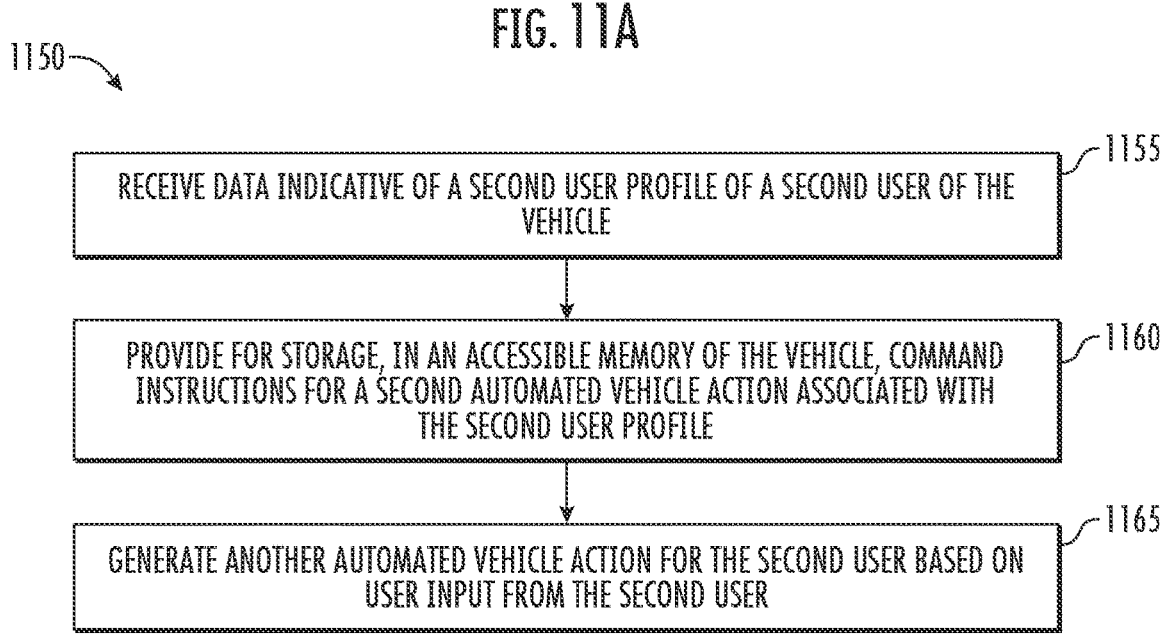
FIG. 11B illustrates a flowchart diagram of an example method for implementing automated vehicle actions for a second user according to an embodiment hereof.

FIG. 11B illustrates a flowchart diagram of an example method 1150 for implementing automated vehicle actions for a second user according to an embodiment hereof. The method 1150 may be performed by a computing system described with reference to the other figures. In an embodiment, the method 1100 may be performed by the control circuit 135 of the computing system 130 of FIG. 1. One or more portions of the method 1100 may be implemented as an algorithm on the hardware components of the devices described herein (e.g., as in FIGS. 1-8 and 12, etc.). For example, the steps of method 1100 may be implemented as operations/instructions that are executable by computing hardware.

FIG. 11B illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 11B is described with reference to elements/terms described with respect to other systems and figures for example illustrated purposes and is not meant to be limiting. One or more portions of method 1150 may be performed additionally, or alternatively, by other systems. For example, one or more portions of method 1150 may be performed by a control circuit 185 of the computing platform 110 or by a user device 115.

In an embodiment, the method 1150 may begin with or otherwise include a step 1155, in which the computing system 130 receives data indicative of a second user profile of a second user 175 of the vehicle 105. In an example, the second user 175 may enter the vehicle 105 to be the driver of the vehicle 105 and another user (e.g., a first user 120) may not be in the vehicle 105 with the second user 175. In another example, the second user 175 may be in the vehicle 105 with another user (e.g., a first user 120). The second user 175 may be the driver or a passenger.

In an embodiment, the computing system 130 may receive the data indicative of the second user profile 260 as a result of detecting that the second user 175 is within the vehicle 105. For instance, as described herein, the computing system 130 may identify a user's key or user device (e.g., through a handshake process) of the second user 175 or the second user 175 may provide user input (e.g., voice input, touch input) to indicate that the second user 175 has entered the vehicle 105. In an embodiment, the computing platform 110 may receive data indicating the user's presence in the vehicle 105 and respond by transmitting the data indicative of the automated vehicle actions associated with the second user profile to the computing system 130 onboard the vehicle 105. The automated vehicle actions associated with the second user profile 260/the second user 175 may be ones that were determined by a different vehicle than the vehicle 105 (e.g., now being used by the second user 175).

The method 1150 in an embodiment may include a step 1160, in which the computing system 130 stores, in an accessible memory of the vehicle 105, command instructions for a second automated vehicle action associated with the second user profile 260. For instance, the computing system 130 may store the command instructions for the second automated vehicle action in the automated vehicle action database 215 onboard the vehicle 105.

The command instructions for the second automated vehicle action may be based on user input of the second user 175 with another vehicle (e.g., second vehicle 180). For example, the second user 175 may provide user input to a display device of the second vehicle 180 to indicate triggering conditions and settings to be automatically implemented for the second automated vehicle action. A computing system (e.g., a control circuit thereof) of the second vehicle 180 may output command instructions for the second automated vehicle action and transmit data indicative of the second automated vehicle action (e.g., associated command instructions) to the computing platform 110. As described herein, the computing platform 110 may store such information in association with the second user profile 260 and transmit it to another vehicle (e.g., vehicle 105).

In an embodiment, the computing system 130 may not store command instructions for automated vehicle actions other than those associated with the second user 175. This may arise, for example, in the event that the second user 175 is the only user in the vehicle 105. Additionally, or alternatively, this may arise in the event that the second user 175 is the only user that has been detected in the vehicle 105. Additionally, or alternatively, this may arise in the event the second user 175 is the driver of the vehicle 105. The computing system 130 may execute command instructions to activate an automated setting of a vehicle function 165A-C for the second user 175 when, at a later time, the triggering conditions are detected.

In an embodiment, the computing system 130 may be configured to concurrently store command instructions for automated vehicle actions associated with a first user 120 and a second user 175. This may arise, for example, in the event the first user 120 and the second user 175 are in the vehicle 105 in a concurrent time period. Additionally, or alternatively, this may arise in the event the first user 120 and the second user 175 are frequent users of the vehicle 105.

In an embodiment, the computing system 130 may execute an automated vehicle action for a first user 120 and an automated vehicle action for a second user 175 at a concurrent/overlapping time period such that the vehicle 105 is performing two automated settings (for two different users) at the same time. By way of example, a first automated vehicle action for a first user 120 may indicate the vehicle 105 is to set the seat heating function to "high" when the outside temperature is below 70 degrees Fahrenheit. A second automated vehicle action for a second user 175 may indicate the vehicle 105 is to set the seat heating function to "low" when the outside temperature is below 65 degrees Fahrenheit.

In a similar manner as described herein, the computing system 130 may compare the vehicle functions, triggering conditions, and settings of the first and second automated vehicle actions to determine whether they conflict with one another. The first automated vehicle action and the second automated vehicle action may be considered to conflict in the event the vehicle 105 (e.g., the relevant vehicle function) cannot concurrently implement the automated settings of the two actions. In the above example, the first automated vehicle action and the second automated vehicle action may be implemented at the same time because the seat of the first user 120 (e.g., sitting in the driver's seat) has a different seat temperature function than the seat of the second user 175 (e.g., sitting in a passenger seat). Thus, in the event the computing system 130 detects an outside temperature of 60 degrees Fahrenheit, the computing system 130 may transmit a first signal to set the first user's seat temperature function to "high" and a second signal to set the second user's seat temperature function to "low". In an embodiment, the computing system 130 may generate content to inform the first and second users of the activation of the automated settings (e.g., via a user interface on the display device of the infotainment system).

In the event a conflict exists, the computing system 130 may attempt to resolve the conflict according to one or more policies. In an embodiment, the policies may include one or more policies for resolving conflicts between automated vehicle actions of different users that are both in the vehicle 105. For example, a policy may include a hierarchy structure that indicates that the automated vehicle actions for whichever user is the driver are to be given priority over other automated vehicle actions. In another example, the hierarchy structure may indicate that the automated vehicle actions for whichever user first entered the vehicle 105 are to be given priority over other automated vehicle actions. In an embodiment, the computing system 130 may generate content to inform the first user 120 or the second user 175 that a particular automated vehicle action is not being implemented in light of the conflict.

The method 1150 in an embodiment may include a step 1165, in which the computing system 130 generates another automated vehicle action for the second user 175 based on user input from the second user 175. For instance, the computing system 130 may utilize the data flow 300 described with reference to FIG. 3 to generate an automated vehicle action for the second user 175 of the vehicle 105. Such vehicle actions may be stored in association with the second user profile 260 of the second user 175. In this way, a user/user profile may be associated with a plurality of automated vehicle actions, where at least one automated vehicle action (e.g., the command instructions associated therewith) was determined via a first vehicle 105 and at least one automated vehicle action (e.g., the command instructions associated therewith) was determined via a second vehicle 180.

In some implementations, the computing system 130 may utilize the data flow 300 to concurrently generate automated vehicle actions for a first user 120 and a second user 175. This may include collecting user input, determining automated vehicle actions, outputting command instructions, performing deconfliction analysis, etc. for the first user 120 and the second user 175 at the same time.

Figure 12:
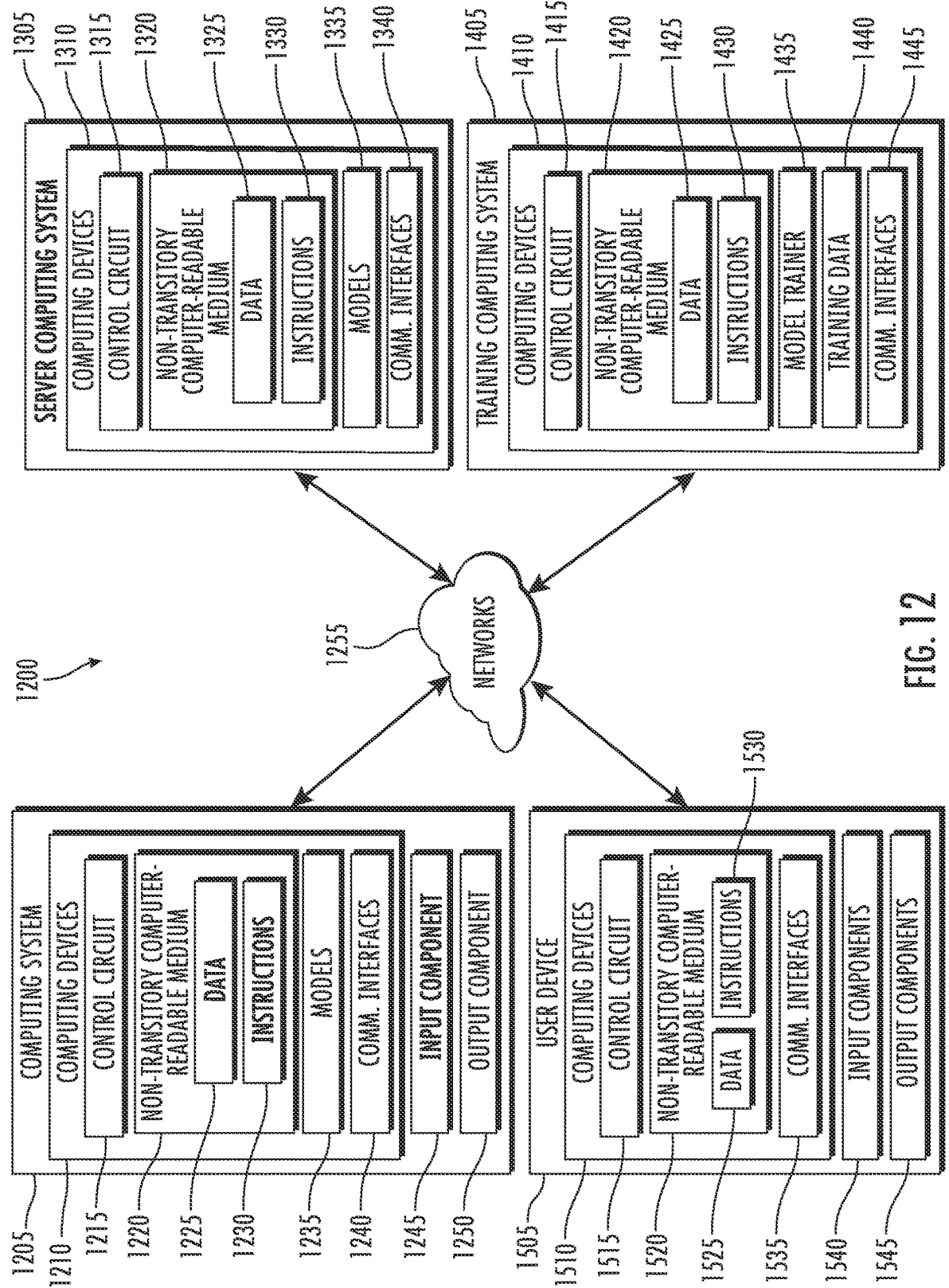
FIG. 12 illustrates a block diagram of an example computing system according to an embodiment hereof.

FIG. 12 illustrates a block diagram of an example computing system 1200 according to an embodiment hereof. The system 1200 includes a computing system 1205 (e.g., a computing system onboard a vehicle), a server computing system 1305 (e.g., a remote computing system, cloud computing platform), a training computing system 1405, and a user device 1505 (e.g., corresponding to user device 115 of a user) that are communicatively coupled over one or more networks 1255.

The computing system 1205 may include one or more computing devices 1210 or circuitry. For instance, the computing system 1205 may include a control circuit 1215 and a non-transitory computer-readable medium 1220, also referred to herein as memory. In an embodiment, the control circuit 1215 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 1215 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 1215 may be programmed by one or more computer-readable or computer-executable instructions stored on the non-transitory computer-readable medium 1220.

In an embodiment, the non-transitory computer-readable medium 1220 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 1220 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1220 may store information that may be accessed by the control circuit 1215. For instance, the non-transitory computer-readable medium 1220 (e.g., memory devices) may store data 1225 that may be obtained, received, accessed, written, manipulated, created, and/or stored. The data 1225 may include, for instance, any of the data or information described herein. In some implementations, the computing system 1205 may obtain data from one or more memories that are remote from the computing system 1205.

The non-transitory computer-readable medium 1220 may also store computer-readable instructions 1230 that may be executed by the control circuit 1215. The instructions 1230 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1215 to perform one or more functional tasks. The modules and computer-readable/executable instructions may be described as performing various operations or tasks when the control circuit 1215 or other hardware component is executing the modules or computer-readable instructions.

The instructions 1230 may be executed in logically and/or virtually separate threads on the control circuit 1215. For example, the non-transitory computer-readable medium 1220 may store instructions 1230 that when executed by the control circuit 1215 cause the control circuit 1215 to perform any of the operations, methods and/or processes described herein. In some cases, the non-transitory computer-readable medium 1220 may store computer-executable instructions or computer-readable instructions, such as instructions to perform at least a portion of the methods of FIG. 10A-B or 11A-B.

In an embodiment, the computing system 1205 may store or include one or more machine-learned models 1235. For example, the machine-learned models 1235 may be or may otherwise include various machine-learned models. In an embodiment, the machine-learned models 1235 may include neural networks (e.g., deep neural networks) or other types of machine-learned models, including non-linear models and/or linear models. Neural networks may include feedforward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

In an aspect of the present disclosure, the models 1235 may be used to generate automated vehicle actions in accordance with the systems and methods described in U.S. patent application Ser. No. 18/081,318.

In an embodiment, the one or more machine-learned models 1235 may be received from the server computing system 1305 over networks 1255, stored in the computing system 1205 (e.g., non-transitory computer-readable medium 1220), and then used or otherwise implemented by the control circuit 1215. In an embodiment, the computing system 1205 may implement multiple parallel instances of a single model.

Additionally, or alternatively, one or more machine-learned models 1235 may be included in or otherwise stored and implemented by the server computing system 1305 that communicates with the computing system 1205 according to a client-server relationship. For example, the machine-learned models 1235 may be implemented by the server computing system 1305 as a portion of a web service. Thus, one or more models 1235 may be stored and implemented at the computing system 1205 and/or one or more models 1235 may be stored and implemented at the server computing system 1305.

The computing system 1205 may include one or more communication interfaces 1240. The communication interfaces 1240 may be used to communicate with one or more other systems. The communication interfaces 1240 may include any circuits, components, software, etc. for communicating via one or more networks (e.g., networks 1255). In some implementations, the communication interfaces 1240 may include for example, one or more of a communications controller, receiver, transceiver, transmitter, port, conductors, software and/or hardware for communicating data/information.

The computing system 1205 may also include one or more user input components 1245 that receives user input. For example, the user input component 1245 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 1205 may include one or more output components 1250. The output components 1250 may include hardware and/or software for audibly or visually producing content. For instance, the output components 1250 may include one or more speakers, earpieces, headsets, handsets, etc. The output components 1250 may include a display device, which may include hardware for displaying a user interface and/or messages for a user. By way of example, the output component 1250 may include a display screen, CRT, LCD, plasma screen, touch screen, TV, projector, tablet, and/or other suitable display components.

The server computing system 1305 may include one or more computing devices 1310. In an embodiment, the server computing system 1305 may include or is otherwise implemented by one or more server computing devices. In instances in which the server computing system 1305 includes plural server computing devices, such server computing devices may operate according to sequential computing architectures, parallel computing architectures, or some combination thereof.

The server computing system 1305 may include a control circuit 1315 and a non-transitory computer-readable medium 1320, also referred to herein as memory 1320. In an embodiment, the control circuit 1315 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1315 may be programmed by one or more computer-readable or computer-executable instructions stored on the non-transitory computer-readable medium 1320.

In an embodiment, the non-transitory computer-readable medium 1320 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1320 may store information that may be accessed by the control circuit 1315. For instance, the non-transitory computer-readable medium 1320 (e.g., memory devices) may store data 1325 that may be obtained, received, accessed, written, manipulated, created, and/or stored. The data 1325 may include, for instance, any of the data or information described herein. In some implementations, the server computing system 1305 may obtain data from one or more memories that are remote from the server computing system 1305.

The non-transitory computer-readable medium 1320 may also store computer-readable instructions 1330 that may be executed by the control circuit 1315. The instructions 1330 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1315 to perform one or more functional tasks. The modules and computer-readable/executable instructions may be described as performing various operations or tasks when the control circuit 1315 or other hardware component is executing the modules or computer-readable instructions.

The instructions 1330 may be executed in logically and/or virtually separate threads on the control circuit 1315. For example, the non-transitory computer-readable medium 1320 may store instructions 1330 that when executed by the control circuit 1315 cause the control circuit 1315 to perform any of the operations, methods and/or processes described herein. In some cases, the non-transitory computer-readable medium 1320 may store computer-executable instructions or computer-readable instructions, such as instructions to perform at least a portion of the methods of FIG. 10A-B or 11A-B.

The server computing system 1305 may store or otherwise include one or more machine-learned models 1335. The machine-learned models 1335 may include or be the same as the models 1235 stored in computing system 1205. In an embodiment, the machine-learned models 1335 may include an unsupervised learning model. In an embodiment, the machine-learned models 1335 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models). In an embodiment, the machine-learned models 1335 may be configured to help create automated vehicle actions in accordance with the systems and methods of U.S. patent application Ser. No. 18/081,318.

The machine-learned models described in this specification may have various types of input data and/or combinations thereof, representing data available to sensors and/or other systems onboard a vehicle. Input data may include, for example, latent encoding data (e.g., a latent space representation of an input, etc.), statistical data (e.g., data computed and/or calculated from some other data source), sensor data (e.g., raw and/or processed data captured by a sensor of the vehicle), or other types of data.

The server computing system 1305 may include one or more communication interfaces 1340. The communication interfaces 1340 may be used to communicate with one or more other systems. The communication interfaces 1340 may include any circuits, components, software, etc. for communicating via one or more networks (e.g., networks 1255). In some implementations, the communication interfaces 1340 may include for example, one or more of a communications controller, receiver, transceiver, transmitter, port, conductors, software and/or hardware for communicating data/information.

The computing system 1205 and/or the server computing system 1305 may train the models 1235, 1335 via interaction with the training computing system 1405 that is communicatively coupled over the networks 1255. The training computing system 1405 may be separate from the server computing system 1305 or may be a portion of the server computing system 1305.

The training computing system 1405 may include one or more computing devices 1410. In an embodiment, the training computing system 1405 may include or is otherwise implemented by one or more server computing devices. In instances in which the training computing system 1405 includes plural server computing devices, such server computing devices may operate according to sequential computing architectures, parallel computing architectures, or some combination thereof.

The training computing system 1405 may include a control circuit 1415 and a non-transitory computer-readable medium 1420, also referred to herein as memory 1420. In an embodiment, the control circuit 1415 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1415 may be programmed by one or more computer-readable or computer-executable instructions stored on the non-transitory computer-readable medium 1420.

In an embodiment, the non-transitory computer-readable medium 1420 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1420 may store information that may be accessed by the control circuit 1415. For instance, the non-transitory computer-readable medium 1420 (e.g., memory devices) may store data 1425 that may be obtained, received, accessed, written, manipulated, created, and/or stored. The data 1425 may include, for instance, any of the data or information described herein. In some implementations, the training computing system 1405 may obtain data from one or more memories that are remote from the training computing system 1405.

The non-transitory computer-readable medium 1420 may also store computer-readable instructions 1430 that may be executed by the control circuit 1415. The instructions 1430 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1415 to perform one or more functional tasks. The modules and computer-readable/executable instructions may be described as performing various operations or tasks when the control circuit 1415 or other hardware component is executing the modules or computer-readable instructions.

The instructions 1430 may be executed in logically or virtually separate threads on the control circuit 1415. For example, the non-transitory computer-readable medium 1420 may store instructions 1430 that when executed by the control circuit 1415 cause the control circuit 1415 to perform any of the operations, methods and/or processes described herein. In some cases, the non-transitory computer-readable medium 1420 may store computer-executable instructions or computer-readable instructions, such as instructions to perform at least a portion of the methods of FIG. 10A-B or 11A-B.

The training computing system 1405 may include a model trainer 1435 that trains the machine-learned models 1235, 1335 stored at the computing system 1205 and/or the server computing system 1305 using various training or learning techniques. For example, the models 1235, 1335 may be trained using a loss function. By way of example, for training a machine-learned clustering model, the model trainer 1435 may use a clustering loss function. The clustering loss function may be configured to balance two competing objectives. First, the clustering loss function may be configured to seek to produce confident assignments of input data elements to clusters. The clustering loss function may balance this first objective with a second objective that prevents a trivial solution, in which all elements of the input data are mapped to a single cluster. Thus, the clustering loss function may encourage each input to be confidently assigned to one of the clusters, but also encourage mapping of the input data points across multiple clusters.

The model trainer may train the models 1235, 1335 (e.g., a machine-learned clustering model) in an unsupervised fashion. As such, the models may be effectively trained using unlabeled data for particular applications or problem domains, which improves performance and adaptability of the models.

The training computing system 1405 may modify parameters of the models 1235, 1335 (e.g., the machine-learned clustering model 320) based on the loss function (e.g., clustering loss function) such that the models 1235, 1335 may be effectively trained for specific applications in an unsupervised manner without labeled data. This may be particularly useful for effectively training a model to cluster complex, unlabeled data sets.

The model trainer 1435 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 1435 may perform a number of generalization techniques (e.g., weight decays, dropouts, etc.) to improve the generalization capability of a model being trained. In particular, the model trainer 1435 may train the machine-learned models 1235, 1335 based on a set of training data 1440.

The training data 1440 may include unlabeled training data for training in an unsupervised fashion. In an example, the training data 1440 may include unlabeled sets of data indicative of training user-selected settings and data indicative of training observed conditions, for a particular vehicle function. The training data 1440 may be specific to a particular vehicle function to help focus the models 1235, 1335 on the particular vehicle function.

In an embodiment, if the user has provided consent/authorization, training examples may be provided by the computing system 1205 (e.g., of the user's vehicle). Thus, in such implementations, a model 1235 provided to the computing system 1205 may be trained by the training computing system 1405 in a manner to personalize the model 1235.

The model trainer 1435 may include computer logic utilized to provide desired functionality. The model trainer 1435 may be implemented in hardware, firmware, and/or software controlling a general-purpose processor. For example, in an embodiment, the model trainer 1435 may include program files stored on a storage device, loaded into a memory and executed by one or more processors. In other implementations, the model trainer 1435 may include one or more sets of computer-executable instructions that are stored in a tangible computer-readable storage medium such as RAM, hard disk, or optical or magnetic media.

The training computing system 1405 may include one or more communication interfaces 1445. The communication interfaces 1445 may be used to communicate with one or more other systems. The communication interfaces 1445 may include any circuits, components, software, etc. for communicating via one or more networks (e.g., networks 1255). In some implementations, the communication interfaces 1445 may include for example, one or more of a communications controller, receiver, transceiver, transmitter, port, conductors, software and/or hardware for communicating data/information.

The user device 1505 may include a mobile user device, phone, laptop, tablet, wearable device (e.g., smart watch, smart glasses, headphones), personal digital assistant, gaming system, or other type of user device. The user device 1505 may include one or more computing devices 1510 or circuitry. For instance, the user device 1505 may include a control circuit 1515 and a non-transitory computer-readable medium 1520, also referred to herein as memory. In an embodiment, the control circuit 1515 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1515 may be programmed by one or more computer-readable or computer-executable instructions stored on the non-transitory computer-readable medium 1520.

In an embodiment, the non-transitory computer-readable medium 1520 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 1520 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1520 may store information that may be accessed by the control circuit 1515. For instance, the non-transitory computer-readable medium 1520 (e.g., memory devices) may store data 1525 that may be obtained, received, accessed, written, manipulated, created, and/or stored. The data 1525 may include, for instance, any of the data or information described herein. In some implementations, the user device 1505 may obtain data from one or more memories that are remote from the user device 1505.

The non-transitory computer-readable medium 1520 may also store computer-readable instructions 1530 that may be executed by the control circuit 1515. The instructions 1530 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1515 to perform one or more functional tasks. The modules and computer-readable/executable instructions may be described as performing various operations or tasks when the control circuit 1515 or other hardware component is executing the modules or computer-readable instructions.

The instructions 1530 may be executed in logically and/or virtually separate threads on the control circuit 1515. For example, the non-transitory computer-readable medium 1520 may store instructions 1530 that when executed by the control circuit 1515 cause the control circuit 1515 to perform any of the operations, methods and/or processes described herein. In some cases, the non-transitory computer-readable medium 1520 may store computer-executable instructions or computer-readable instructions, such as instructions to perform at least a portion of the methods of FIG. 10A-B or 11A-B.

The user device 1505 may include one or more communication interfaces 1535. The communication interfaces 1535 may be used to communicate with one or more other systems. The communication interfaces 1535 may include any circuits, components, software, etc. for communicating via one or more networks (e.g., networks 1255). In some implementations, the communication interfaces 1535 may include for example, one or more of a communications controller, receiver, transceiver, transmitter, port, conductors, software and/or hardware for communicating data/information.

The user device 1505 may also include one or more user input components 1540 that receives user input. For example, the user input component 1540 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 1505 may include one or more output components 1545. The output components 1545 may include hardware and/or software for audibly or visually producing content. For instance, the output components 1545 may include one or more speakers, earpieces, headsets, handsets, etc. The output components 1545 may include a display device, which may include hardware for displaying a user interface and/or messages for a user. By way of example, the output component 1545 may include a display screen, CRT, LCD, plasma screen, touch screen, TV, projector, tablet, and/or other suitable display components.

The one or more networks 1255 may be any type of communications network, such as a local area network (e.g., intranet), wide area network (e.g., Internet), or some combination thereof and may include any number of wired or wireless links. In general, communication over a network 1255 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 12 illustrates one example computing system that may be used to implement the present disclosure. Other computing systems may be used as well. For example, in an embodiment, the computing system 1205 may include the model trainer 1435 and the training data 1440. In such implementations, the models 1235, 1335 may be both trained and used locally at the computing system 1205. In some of such implementations, the computing system 1205 may implement the model trainer 1435 to personalize the models 1235, 1335.

Additional Discussion of Various Embodiments

Embodiment 1 relates to a computing system. The computing system may include a control circuit. The control circuit may be configured to generate content for presentation to a user via a user interface of a display device. The content may include one or more user interface elements for inputting one or more triggering conditions associated with a vehicle function of a vehicle and one or more settings of the vehicle function. The control circuit may be configured to receive, via the user interface, data indicative of user input specifying the one or more triggering conditions. The control circuit may be configured to receive, via the user interface, data indicative of user input specifying the one or more settings of the vehicle function. The control circuit may be configured to determine an automated vehicle action that defines a relationship between the one or more triggering conditions and the one or more settings of the vehicle function. The control circuit may be configured to output command instructions for the vehicle to implement the automated vehicle action for automatically controlling the vehicle function based on whether the vehicle detects the one or more triggering conditions.

Embodiment 2 includes the computing system of embodiment 1. In this embodiment, the automated vehicle action may indicate at least one of: (i) when, (ii) where, or (iii) under what temperature conditions, the vehicle is to automatically control the vehicle function in accordance with the one or more settings.

Embodiment 3 includes the computing system of any of embodiments 1 or 2. In this embodiment, the control circuit may be further configured to determine whether a conflict between the automated vehicle action and a pre-existing automated vehicle action exists or does not exist.

Embodiment 4 includes the computing system of any of embodiments 1 to 3. In this embodiment, the control circuit may be further configured to: in response to determining the conflict does exist, generate a prompt for presentation to the user via the user interface of the display device. The prompt may request the user to indicate whether to replace the pre-existing automated vehicle action with the automated vehicle action or to discard the automated vehicle action.

Embodiment 5 includes the computing system of any of embodiments 1 to 4. In this embodiment, the control circuit may be further configured to provide the command instructions for storage in an accessible memory on the vehicle for execution at a subsequent time.

Embodiment 6 includes the computing system of any of embodiments 1 to 5. In this embodiment, the command instructions may be stored in the accessible memory with a plurality of other command instructions for a plurality of other automated vehicle actions associated with the user.

Embodiment 7 includes the computing system of any of embodiments 1 to 6. In this embodiment, the control circuit may be further configured to: detect an occurrence of the one or more triggering conditions; and based on the one or more triggering conditions, transmit a signal to implement the one or more settings of the vehicle function.

Embodiment 8 includes the computing system of any of embodiments 1 to 7. In this embodiment, the control circuit may be further configured to transmit, over a network to a server system, a communication indicative of the command instructions for storage in association with a user profile of the user.

Embodiment 9 includes the computing system of any of embodiments 1 to 8. In this embodiment, the display device may be a display screen of a mobile user device.

Embodiment 10 includes the computing system of any of embodiments 1 to 9. In this embodiment, the display device may be a display screen of the vehicle.

Embodiment 11 includes the computing system of any of embodiments 1 to 10. In this embodiment, the vehicle function may include: (i) a window function, (ii) a seat function, (iii) a temperature function, or (iv) a music function.

Embodiment 12 includes the computing system of any of embodiments 1 to 11. In this embodiment, the seat function may include: a seat temperature function, a seat ventilation function, or a seat massage function.

Embodiment 13 includes the computing system of any of embodiments 1 to 12. In this embodiment, the one or more settings of the vehicle function may be indicative of at least one of: (i) an on/off state, (ii) an open/close state, (iii) a temperature level, (iv) a massage level, or (v) a music selection.

Embodiment 14 includes the computing system of any of embodiments 1 to 13. In this embodiment, the user may be a first user and the command instructions for the automated vehicle action may be associated with a first user profile of the first user. The control circuit may be further configured to: receive data indicative of a second user profile of a second user of the vehicle; and provide for storage, in an accessible memory of the vehicle, command instructions for a second automated vehicle action associated with the second user profile. The second automated vehicle action may be based on user input provided by the second user to a second user interface on a second display device.

Embodiment 15 includes the computing system of any of embodiments 1 to 14. In this embodiment, the second display device may be a display screen of a mobile user device or a display screen of another vehicle.

Embodiment 16 relates to a computer-implemented method. The method may include generating content for presentation to a user via a user interface of a display device. The content may include one or more user interface elements for inputting one or more triggering conditions associated with a vehicle function of a vehicle and one or more settings of the vehicle function. The method may include receiving, via the user interface, data indicative of user input specifying the one or more triggering conditions. The method may include receiving, via the user interface, data indicative of user input specifying the one or more settings of the vehicle function. The method may include determining an automated vehicle action that defines a relationship between the one or more triggering conditions and the one or more settings of the vehicle function. The method may include outputting command instructions for the vehicle to implement the automated vehicle action for automatically controlling the vehicle function based on whether the vehicle detects the one or more triggering conditions.

Embodiment 17 includes the computer-implemented method of embodiment 16. In this embodiment, the method may further include: determining whether a conflict between the automated vehicle action and a pre-existing automated vehicle action exists or does not exist; and in response to determining the conflict does exist, generating a prompt for presentation to the user via the user interface of the display device. The prompt may indicate the conflict between the automated vehicle action and the pre-existing automated vehicle action.

Embodiment 18 includes the computer-implemented method of any of embodiments 16 or 17. In this embodiment, the method may further include providing the command instructions for storage in an accessible memory on the vehicle for execution at a subsequent time.

Embodiment 19 includes the computer-implemented method of any of embodiments 16 to 18. In this embodiment, the command instructions may be stored in the accessible memory with a plurality of other command instructions for a plurality of other automated vehicle actions associated with the user.

Embodiment 20 relates to one or more non-transitory computer-readable media that store instructions that are executable by a control circuit to perform operations. The control circuit may generate content for presentation to a user via a user interface of a display device.

The content may include one or more user interface elements for inputting one or more triggering conditions associated with a vehicle function of a vehicle and one or more settings of the vehicle function. The control circuit may receive, via the user interface, data indicative of user input specifying the one or more triggering conditions. The control circuit may receive, via the user interface, data indicative of user input specifying the one or more settings of the vehicle function. The control circuit may determine an automated vehicle action that defines a relationship between the one or more triggering conditions and the one or more settings of the vehicle function. The control circuit may output command instructions for the vehicle to implement the automated vehicle action for automatically controlling the vehicle function based on whether the vehicle detects the one or more triggering conditions.

Additional Disclosure

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), ..., (i), (ii), (iii), ..., etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A mobile computing system comprising:
a control circuit configured to:
generate content for presentation to a user via a user interface of a display device, the content comprising one or more user interface elements for inputting one or more triggering conditions associated with a vehicle function of a vehicle and one or more settings of the vehicle function, wherein the user interface is associated with a software application of the mobile computing system;
receive, via the user interface, data indicative of user input specifying the one or more triggering conditions, wherein the user interface is configured to allow the user to define the one or more triggering conditions by entering the user input specifying the one or more triggering conditions;
receive, via the user interface, data indicative of user input specifying the one or more settings of the vehicle function, wherein the user interface is configured to allow the user to define the one or more settings of the vehicle function to be automatically activated based on the one or more triggering conditions;
determine an automated vehicle action associated with the user, the automated vehicle action defines a relationship between the one or more triggering conditions and the one or more settings of the vehicle function;
determine that a conflict exists between the automated vehicle action and a pre-existing automated vehicle action associated with the user;
generate a prompt for presentation to the user via the display device, wherein the prompt requests the user to indicate whether to replace the pre-existing automated vehicle action with the automated vehicle action or to discard the automated vehicle action; and
output command instructions for the vehicle to implement the automated vehicle action, wherein the vehicle is to automatically activate the vehicle function based on whether the vehicle detects the one or more triggering conditions.

2. The mobile computing system of claim 1, wherein the automated vehicle action indicates at least one of: (i) when, (ii) where, or (iii) under what temperature conditions, the vehicle is to automatically control the vehicle function in accordance with the one or more settings.

3. The mobile computing system of claim 1, wherein the control circuit is further configured to:
provide the command instructions for storage in an accessible memory on the vehicle for execution at a subsequent time.

4. The mobile computing system of claim 3, wherein the command instructions are stored in the accessible memory with a plurality of other command instructions for a plurality of other automated vehicle actions associated with the user.

5. The mobile computing system of claim 1, wherein the control circuit is further configured to:
detect an occurrence of the one or more triggering conditions; and
based on the one or more triggering conditions, transmit a signal to implement the one or more settings of the vehicle function.

6. The mobile computing system of claim 1, wherein the control circuit is further configured to:
transmit, over a network to a server system, a communication indicative of the command instructions for storage in association with a user profile of the user.

7. The mobile computing system of claim 1, wherein the display device is a touchscreen.

8. The mobile computing system of claim 1, wherein the vehicle function comprises: (i) a window function, (ii) a seat function, (iii) a temperature function, or (iv) a music function.

9. The mobile computing system of claim 8, wherein the seat function comprises: a seat temperature function, a seat ventilation function, or a seat massage function.

10. The mobile computing system of claim 1, wherein the one or more settings of the vehicle function are indicative of at least one of: (i) an on/off state, (ii) an open/close state, (iii) a temperature level, (iv) a massage level, or (v) a music selection.

11. The mobile computing system of claim 1, wherein the user is a first user, wherein the command instructions for the automated vehicle action are associated with a first user profile of the first user, and wherein the control circuit is further configured to:
receive data indicative of a second user profile of a second user of the vehicle; and
provide command instructions for a second automated vehicle action associated with the second user profile.

12. A computer-implemented method comprising:
generating content for presentation to a user via a user interface of a display device, the content comprising one or more user interface elements for inputting one or more triggering conditions associated with a vehicle function of a vehicle and one or more settings of the vehicle function, wherein the user interface is associated with a software application;
receiving, via the user interface, data indicative of user input specifying the one or more triggering conditions, wherein the user interface is configured to allow the user to define the one or more triggering conditions by entering the user input specifying the one or more triggering conditions;
receiving, via the user interface, data indicative of user input specifying the one or more settings of the vehicle function, wherein the user interface is configured to allow the user to define the one or more settings of the vehicle function to be automatically activated based on the one or more triggering conditions;
determining an automated vehicle action associated with the user, the automated vehicle action defines a relationship between the one or more triggering conditions and the one or more settings of the vehicle function;
determining that a conflict exists between the automated vehicle action and a pre-existing automated vehicle action associated with the user;
generating a prompt for presentation to the user via the display device, wherein the prompt requests the user to indicate whether to replace the pre-existing automated vehicle action with the automated vehicle action or to discard the automated vehicle action; and outputting command instructions for the vehicle to implement the automated vehicle action, wherein the vehicle is to automatically activate the vehicle function based on whether the vehicle detects the one or more triggering conditions.

13. The computer-implemented method of claim 12, further comprising:
   determining whether a conflict between the automated vehicle action and a pre-existing automated vehicle action exists or does not exist; and
   in response to determining the conflict does exist, generating a prompt for presentation to the user via the user interface of the display device, the prompt indicating the conflict between the automated vehicle action and the pre-existing automated vehicle action.

14. The computer-implemented method of claim 12, further comprising:
   providing the command instructions for storage in an accessible memory on the vehicle for execution at a subsequent time.

15. The computer-implemented method of claim 14, wherein the command instructions are stored in the accessible memory with a plurality of other command instructions for a plurality of other automated vehicle actions associated with the user.

16. The computer-implemented method of claim 12, wherein the user is a first user, wherein the command instructions for the automated vehicle action are associated with a first user profile of the first user, and wherein the method further comprises:
   receiving data indicative of a second user profile of a second user of the vehicle; and
   providing for storage, in an accessible memory of the vehicle, command instructions for a second automated vehicle action associated with the second user profile, wherein the second automated vehicle action is based on user input provided by the second user to a second user interface on a second display device.

17. The computer-implemented method of claim 12, further comprising receiving, via the user interface, data indicative of user input specifying a name for the automated vehicle action.

18. One or more non-transitory computer-readable media that store instructions that are executable by a control circuit to:
   generate content for presentation to a user via a user interface of a display device, the content comprising one or more user interface elements for inputting one or more triggering conditions associated with a vehicle function of a vehicle and one or more settings of the vehicle function, wherein the user interface is associated with a software application;
   receive, via the user interface, data indicative of user input specifying the one or more triggering conditions, wherein the user interface is configured to allow the user to define the one or more triggering conditions by entering the user input specifying the one or more triggering conditions;
   receive, via the user interface, data indicative of user input specifying the one or more settings of the vehicle function, wherein the user interface is configured to allow the user to define the one or more settings of the vehicle function to be automatically activated based on the one or more triggering conditions;
   determine an automated vehicle action associated with the user, the automated vehicle action defines a relationship between the one or more triggering conditions and the one or more settings of the vehicle function;
   determine that a conflict exists between the automated vehicle action and a pre-existing automated vehicle action associated with the user;
   generate a prompt for presentation to the user via the display device, wherein the prompt requests the user to indicate whether to replace the pre-existing automated vehicle action with the automated vehicle action or to discard the automated vehicle action; and
   output command instructions for the vehicle to implement the automated vehicle action, wherein the vehicle is to automatically activate the vehicle function based on whether the vehicle detects the one or more triggering conditions.

* * * * *